(12) United States Patent
Furuya

(10) Patent No.: US 10,540,795 B2
(45) Date of Patent: Jan. 21, 2020

(54) IMAGE COMBINATION APPARATUS, IMAGE COMBINATION METHOD, IMAGE COMBINATION PROGRAM, AND RECORDING MEDIUM STORING IMAGE COMBINATION PROGRAM

(71) Applicant: FUJIFILM Corporation, Tokyo (JP)

(72) Inventor: Hiroyuki Furuya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 67 days.

(21) Appl. No.: 15/681,441

(22) Filed: Aug. 21, 2017

(65) Prior Publication Data

US 2017/0345200 A1 Nov. 30, 2017

Related U.S. Application Data

(63) Continuation of application No. PCT/JP2016/053627, filed on Feb. 8, 2016.

(30) Foreign Application Priority Data

Mar. 11, 2015 (JP) ................................. 2015-048013

(51) Int. Cl.
*G06K 9/00* (2006.01)
*G06T 11/60* (2006.01)
(Continued)

(52) U.S. Cl.
CPC ................ *G06T 11/60* (2013.01); *G06T 7/11* (2017.01); *G06T 7/136* (2017.01); *G06T 7/70* (2017.01);
(Continued)

(58) Field of Classification Search
CPC combination set(s) only.
See application file for complete search history.

(56) References Cited

U.S. PATENT DOCUMENTS 5,644,765 A * 7/1997 Shimura ............. G06F 16/5838
6,647,153 B1 11/2003 Ito
(Continued)

FOREIGN PATENT DOCUMENTS

JP 2002-077526 3/2002
JP 3562516 9/2004
(Continued)

OTHER PUBLICATIONS

"International Search Report (Form PCT/ISA/210) of PCT/JP2016/053627," dated Apr. 5, 2016, with English translation thereof, pp. 1-5.
(Continued)

*Primary Examiner* — Alex Kok S Liew
(74) *Attorney, Agent, or Firm* — JCIPRNET

(57) ABSTRACT

An object in a target image to be combined with a combination region of a template image is determined. A plurality of extraction regions which include the determined object and have a shape similar to the shape of the combination region are defined. Among extraction images in the extraction regions, the extraction region in which the similarity between the impression of the template image and the impression of the extraction image is equal to or greater than a threshold value is determined. The extraction image in the determined extraction region is combined with the combination region of the template image.

21 Claims, 24 Drawing Sheets

(51) Int. Cl.
*G06T 7/136* (2017.01)
*G06T 7/11* (2017.01)
*G06T 7/70* (2017.01)

(52) U.S. Cl.
CPC ............... *G06T 2207/20216* (2013.01); *G06T 2207/20224* (2013.01)

(56) References Cited

U.S. PATENT DOCUMENTS

| | | | |
|---|---|---|---|
| 7,010,176 | B2 | 3/2006 | Kusunoki |
| 8,139,826 | B2 | 3/2012 | Ryuto et al. |
| 9,208,595 | B2 | 12/2015 | Sasaki et al. |
| 2002/0041705 | A1* | 4/2002 | Lin ...................... G06K 9/3241 382/165 |
| 2008/0193048 | A1* | 8/2008 | Sun ........................ G06T 11/60 382/284 |
| 2009/0116752 | A1 | 5/2009 | Isomura et al. |
| 2009/0263038 | A1* | 10/2009 | Luo .......................... G06K 9/32 382/254 |
| 2012/0321217 | A1* | 12/2012 | Cok ........................ G06T 11/60 382/284 |

FOREIGN PATENT DOCUMENTS

| | | |
|---|---|---|
| JP | 3808231 | 8/2006 |
| JP | 4052128 | 2/2008 |
| JP | 2008-305275 | 12/2008 |
| JP | 2009-239799 | 10/2009 |
| JP | 2010-068212 | 3/2010 |
| JP | 2011-103135 | 5/2011 |
| JP | 2013-081208 | 5/2013 |
| JP | 2014-016825 | 1/2014 |

OTHER PUBLICATIONS

"Written Opinion of the International Searching Authority (Form PCT/ISA/237) of PCT/JP2016/053627," dated Apr. 5, 2016, with English translation thereof, pp. 1-10.

* cited by examiner

FIG. 5

TEMPLATE IMAGE ANALYSIS INFORMATION TABLE

| TEMPLATE IMAGE | IMPRESSION | IMAGE ANALYSIS INFORMATION | | | | |
|---|---|---|---|---|---|---|
| | | BRIGHTNESS | CONTRAST | CHROMA | COLOR | COLOR BALANCE |
| T1 | CUTE/ GENTLE | L8 | L5 | L4 | --- | --- |
| T2 | GENTLE/ PLEASANT | L8 | L6 | L4 | --- | --- |
| T3 | CHIC | L3 | L2 | L7 | --- | --- |
| T4 | GENTLE | L7 | L6 | L5 | --- | --- |
| ⋮ | ⋮ | ⋮ | ⋮ | ⋮ | ⋮ | ⋮ |

EXTRACTION IMAGE ANALYSIS INFORMATION TABLE

| EXTRACTION IMAGE | IMAGE ANALYSIS INFORMATION / IMPRESSION | BRIGHTNESS | CONTRAST | CHROMA | COLOR | COLOR BALANCE |
|---|---|---|---|---|---|---|
| 111 | CUTE | L7 | L3 | L3 | — | — |
| 112 | GENTLE | L7 | L3 | L4 | --- | --- |
| 113 | PLEASANT | L8 | L5 | L8 | --- | --- |

FIG. 17

SIMILARITY TABLE

| IMPRESSION OF TEMPLATE IMAGE \ IMPRESSION OF EXTRACTION IMAGE | CUTE | GENTLE | PLEASANT | PRETTY | --- |
|---|---|---|---|---|---|
| CUTE | 1.0 | 0.9 | 0.8 | 0.7 | --- |
| GENTLE | 0.9 | 1.0 | 0.85 | 0.8 | --- |
| PLEASANT | 0.8 | 0.85 | 1.0 | 0.85 | --- |
| PRETTY | 0.7 | 0.8 | 0.85 | 1.0 | --- |
| ⋮ | ⋮ | ⋮ | ⋮ | ⋮ | ⋮ |

# IMAGE COMBINATION APPARATUS, IMAGE COMBINATION METHOD, IMAGE COMBINATION PROGRAM, AND RECORDING MEDIUM STORING IMAGE COMBINATION PROGRAM

CROSS-REFERENCE TO RELATED APPLICATIONS

This application is a Continuation of PCT International Application No. PCT/JP 2016/053627 filed on Feb. 8, 2016, which claims priority under 35 U.S.C § 119(a) to Japanese Patent Application No. 2015-048013 filed on Mar. 11, 2015. Each of the above application(s) is hereby expressly incorporated by reference, in its entirety, into the present application.

BACKGROUND OF THE INVENTION

1. Field of the Invention

The present invention relates to an image combination apparatus, an image combination method, an image combination program, and a recording medium storing the image combination program.

2. Description of the Related Art

A technique has been achieved in which a user attaches a target image to a template, such as a post card, an electronic album, or a photo book, to generate a desired composite image. For example, the following techniques have been proposed: a technique which adjusts the color of an album mount according to the color of a target image to unify the color of the target image and the color of the album mount (JP2013-81208A); and a technique which performs predetermined image processing on the basis of accessory information indicating the impression of a template such that the impression of an image combined with the template is the same as the impression of the template and combines the image with the template (JP3808231B). In addition, for example, the following techniques have been proposed: a technique which detects an important object and performs trimming such that the important object is certainly included (JP4052128B); a technique which determines the percentage of a face region according to a layout and considers the relevance ratio of a person (indicating whether one person is appropriate or whether two persons are appropriate) (JP2014-16825A); and a technique that stores a database in which the feature amounts of an image and a person's impression of the image are associated with each other, calculates an impression from the feature amounts, and displays the image (JP3562516B).

SUMMARY OF THE INVENTION

However, in the technique disclosed in JP2013-81208A, in a case in which the user designates a desired album mount, it is difficult to adjust the color of the album mount, which makes it difficult to obtain unity between the colors. In the technique disclosed in JP3808231 B, predetermined image processing is performed for the image to be combined with the template. As a result, a feeling of strangeness is generated and it is difficult to obtain a composite image that suits the user's taste. The technique disclosed in JP4052128B simply trims the image such that an important object is included. The technique disclosed in JP2014-16825A considers the relevance ratio of a person, but does not consider the balance between the template image and the target image combined with the template image. The technique disclosed in JP3562516B does not consider the impression of the image to be combined and the balance between the template image and the image to be combined.

An object of the invention is to achieve a good balance between a template image and a target image combined with the template image.

According to a first aspect of the invention, there is provided an image combination apparatus comprising: an object determination unit for determining an object in a target image which is combined with a template image having a determined combination region; an extraction region determination unit for determining an extraction region of an extraction image having an impression (impression category) whose similarity to an impression (impression category) of the template image is equal to or greater than a threshold value among extraction images in a plurality of extraction regions which include the object determined by the object determination unit and have a shape similar to the shape of the combination region of the template image in the target image (including a case in which the extraction image is determined); and an image combination unit for combining the extraction image in the extraction region determined by the extraction region determination unit with the combination region of the template image.

The first aspect is also provided for an image combination method. That is, this method comprises: causing the object determination unit to determine the object in the target image which is combined with the template image having the determined combination region; causing the extraction region determination unit to determine the extraction region of the extraction image having the impression whose similarity to the impression of the template image is equal to or greater than the threshold value among extraction images in a plurality of extraction regions which include the object determined by the object determination unit and have the shape similar to the shape of the combination region of the template image in the target image; and causing the image combination unit to combine the extraction image in the extraction region determined by the extraction region determination unit with the combination region of the template image.

The similarity between the impression of the template image and the impression of the extraction image may be obtained from a similarity table for calculating a predetermined similarity.

For example, the impression of the extraction image is determined from at least one extraction image analysis information item among the brightness, contrast, chroma, color, and color balance of the extraction image.

For example, the impression of the template image is determined from at least one template image analysis information item among the brightness, contrast, chroma, color, and color balance of the template image. For example, the impression of the extraction image is determined from at least one extraction image analysis information item among the brightness, contrast, chroma, color, and color balance of the extraction image. The similarity between the impression of the template image and the impression of the extraction image is obtained from a similarity between the template image analysis information and the extraction image analysis information which is the same type as the template image analysis information.

The image combination apparatus may further comprise a first display control unit for displaying the extraction region determined by the extraction region determination unit on a display device so as to be superimposed on the target image. In this case, the image combination unit combines an extraction image in an extraction region which is designated by a designation unit for designating at least one of the extraction regions displayed by the first display control unit with the combination region of the template image.

The image combination apparatus may further comprise: a second display control unit for displaying a composite image obtained by the image combination unit on the display device; an adjustment command input unit for inputting at least one adjustment command among a position adjustment command, an enlargement command, a reduction command, and a rotation command for the extraction image which is combined with the composite image displayed by the second display control unit; a first calculation unit for performing adjustment corresponding to the adjustment command input by the adjustment command input unit and calculating a similarity between the impression of the adjusted extraction image and the impression of the template image; and a notification unit for notifying the similarity calculated by the first calculation unit.

For example, the notification unit notifies the calculated similarity by changing at least one of a color of a frame, a thickness of a frame border, or the type of frame border of a combination region of the composite image displayed by the second display control unit, depending on the similarity calculated by the first calculation unit.

The image combination apparatus may further comprise: a second calculation unit for calculating the similarity between the impression of the extraction image in the extraction region determined by the extraction region determination unit and the impression of the template image; and a target image detection unit for detecting another target image which has an impression with a similarity higher than the similarity calculated by the second calculation unit, is different from the target image, and includes same object as the object determined by the object determination unit. In this case, the image combination unit combines a portion which includes the same object as the object determined by the object determination unit in another target image detected by the target image detection unit with the combination region of the template image.

For example, the target image detection unit detects another target image of which a portion includes the same object as the object determined by the object determination unit, has a shape similar to the shape of the combination region of the template image, and has an impression with a similarity higher than the similarity calculated by the second calculation unit.

According to a second aspect of the invention, there is provided an image combination apparatus comprising: an object determination unit for determining an object in a target image which is combined with a template image having a determined combination region; an extraction region determination unit for determining an extraction region of an extraction image having analysis information, which is the same type as at least one template image analysis information item among the brightness, contrast, chroma, color, and color balance of the template image and whose similarity to the template image analysis information is equal to or greater than a threshold value, among extraction images in a plurality of extraction regions which include the object determined by the object determination unit and have a shape similar to the shape of the combination region of the template image in the target image (the extraction image may be determined); and an image combination unit for combining the extraction image in the extraction region determined by the extraction region determination unit with the combination region of the template image.

The second aspect is also provided for an image combination method. That, this method comprises: causing the object determination unit to determine the object in the target image which is combined with the template image having the determined combination region; causing the extraction region determination unit to determine the extraction region of the extraction image having analysis information, which is the same type as at least one template image analysis information item among the brightness, contrast, chroma, color, and color balance of the template image and whose similarity to the template image analysis information is equal to or greater than the threshold value, among extraction images in a plurality of extraction regions which include the object determined by the object determination unit and have the shape similar to the shape of the combination region of the template image in the target image; and causing the image combination unit to combine the extraction image in the extraction region determined by the extraction region determination unit with the combination region of the template image.

The image combination apparatus may further comprise a first display control unit for displaying the extraction region determined by the extraction region determination unit on a display device so as to be superimposed on the target image. In this case, the image combination unit combines an extraction image of an extraction region which is designated by a designation unit for designating at least one of the extraction regions displayed by the first display control unit with the combination region of the template image.

The image combination apparatus may further comprise: a second display control unit for displaying a composite image obtained by the image combination unit on the display device; an adjustment command input unit for inputting at least one adjustment command among a position adjustment command, an enlargement command, a reduction command, and a rotation command for the extraction image which is combined with the composite image displayed by the second display control unit; a first calculation unit for performing adjustment corresponding to the adjustment command input by the adjustment command input unit and calculating a similarity between the analysis information of the adjusted extraction image and the analysis information of the template image for the same type of analysis information; and a notification unit for notifying the similarity calculated by the first calculation unit.

For example, the notification unit notifies the calculated similarity by changing at least one of a color of a frame, a thickness of a frame border, or the type of frame border of a combination region of the composite image displayed by the second display control unit, depending on the similarity calculated by the first calculation unit.

The image combination apparatus may further comprise: a second calculation unit for calculating the similarity between the analysis information of the extraction image in the extraction region determined by the extraction region determination unit and the analysis information of the template image for the same type of analysis information; and a target image detection unit for detecting another target image which has analysis information with a similarity higher than the similarity calculated by the second calculation unit, is different from the target image, and includes same object as the object determined by the object determination unit. In this case, the image combination unit combines a portion which includes the same object as the object determined by the object determination unit in another target image detected by the target image detection unit with the combination region of the template image.

For example, the target image detection unit detects another target image of which a portion includes the same object as the object determined by the object determination unit, has a shape similar to the shape of the combination region of the template image, and has analysis information with a similarity higher than the similarity calculated by the second calculation unit.

According to a third aspect, there is provided an image combination apparatus comprising: an object image determination unit for determining an object in a target image which is combined with a template image having a determined combination region; an extraction region determination unit for determining an extraction region of an extraction image having an impression which is determined from at least one image feature amount among the brightness, contrast, chroma, color, and color balance of the extraction image in the extraction region and is the same as an impression of the template image, among a plurality of extraction regions which include the object determined by the object image determination unit and have a shape similar to the shape of the combination region of the template image in the target image; and an image combination unit for combining the extraction image in the extraction region determined by the extraction region determination unit with the combination region of the template image.

The third aspect is also provided for an image combination method. That is, this method comprises: causing the object image determination unit for determining the object in the target image which is combined with the template image having the determined combination region; causing the extraction region determination unit to determine the extraction region of the extraction image having the impression which is determined from at least one image feature amount among the brightness, contrast, chroma, color, and color balance of the extraction image in the extraction region and is the same as the impression of the template image, among a plurality of extraction regions which include the object determined by the object image determination unit and have the shape similar to the shape of the combination region of the template image in the target image; and causing the image combination unit to combine the extraction image in the extraction region determined by the extraction region determination unit with the combination region of the template image.

These aspects of the invention are also provided for a non-transitory computer readable recording medium that stores the program that controls a computer of an image combination apparatus.

According to the first aspect, an object in the target image combined with the template image is determined. The object may be determined by the user. Alternatively, for example, person detection or face detection may be performed for the target image to detect the largest person or face, the person or face that is closest to the center of the target image, or the sharpest person or face. Among the extraction images in a plurality of extraction regions which include a determined important image, have different sizes, and have a shape similar to the shape of the combination region of the template image, an extraction image having an impression whose similarity to the impression of the template image is equal to or greater than the threshold value is combined with the template image. Since a portion of the target image which has an impression close to the impression of the template image and includes the determined object is combined with the template image, the template image and the extraction image are well balanced in a composite image. For example, since image processing, such as a color change process, is not performed for the template image, it is possible to obtain a composite image, using the template image that the user wants without any change.

According to the second aspect of the invention, among the extraction images including an important image, an extraction image having analysis information whose similarity to the template image analysis information is equal to or greater than the threshold value is combined with the template image. Since the extraction image to be combined has characteristics close to the characteristics of the template image, a natural composite image is obtained. For example, a color change process is not performed for the template image. Therefore, even when the template image that the user wants is used without any change, it is possible to obtain a natural well-balanced composite image.

According to the third aspect of the invention, among the extraction images in a plurality of extraction regions which include a determined important image, have different sizes, and have a shape similar to the shape of the combination region of the template image, an extraction image that has the same impression as the template image is combined with the template image. Since a portion of the target image which has the same impression as the template image and includes the determined object is combined with the template image, the template image and the extraction image are well balanced in a composite image. For example, since image processing, such as a color change process, is not performed for the template image, it is possible to obtain a composite image, using the template image that the user wants without any change.

BRIEF DESCRIPTION OF THE DRAWINGS

FIG. 5 illustrates an example of a template image analysis information table.

FIG. 17 illustrates an example of a similarity table.

DESCRIPTION OF THE PREFERRED EMBODIMENTS

Figure 1:
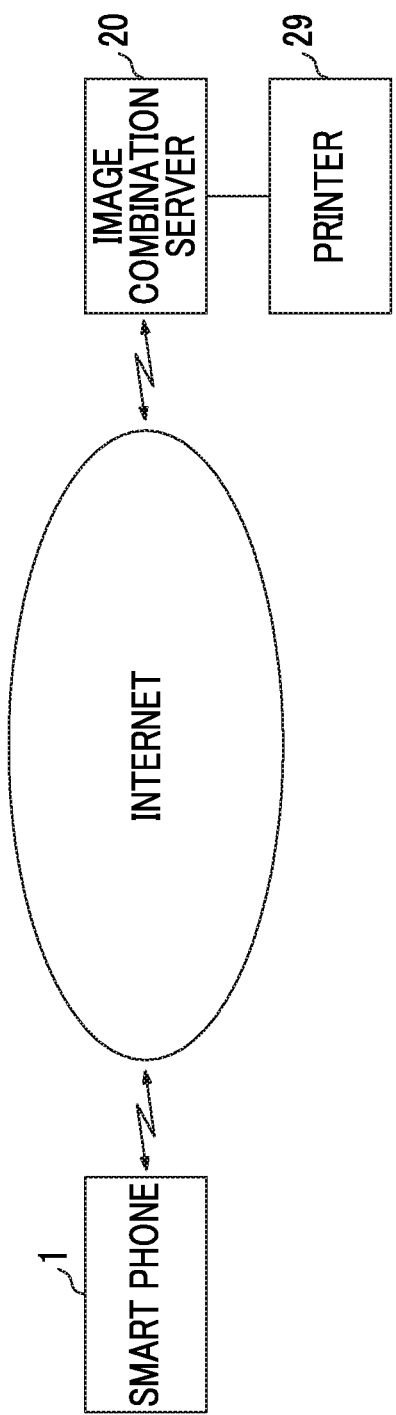
FIG. 1 illustrates the outline of an image combination system.

FIG. 1 illustrates an embodiment of the invention and illustrates the outline of an image combination system.

In this embodiment, a case in which a target image is combined with a template image to generate a composite image of a post card will be described. However, the invention is not limited to the post card and can be applied to all types of systems, such as electronic albums and photo goods that combine a target image with a template image to generate a composite image.

The image combination system includes a smart phone (multi-function mobile phone) 1 and an image combination server (image combination apparatus) 20 that can communicate with each other through a network such as the Internet. For example, a client computer may be used instead of the smart phone 1. A printer 29 that prints a post card from image data indicating a composite image generated in the image combination server 20 is connected to the image combination server 20.

Figure 2:
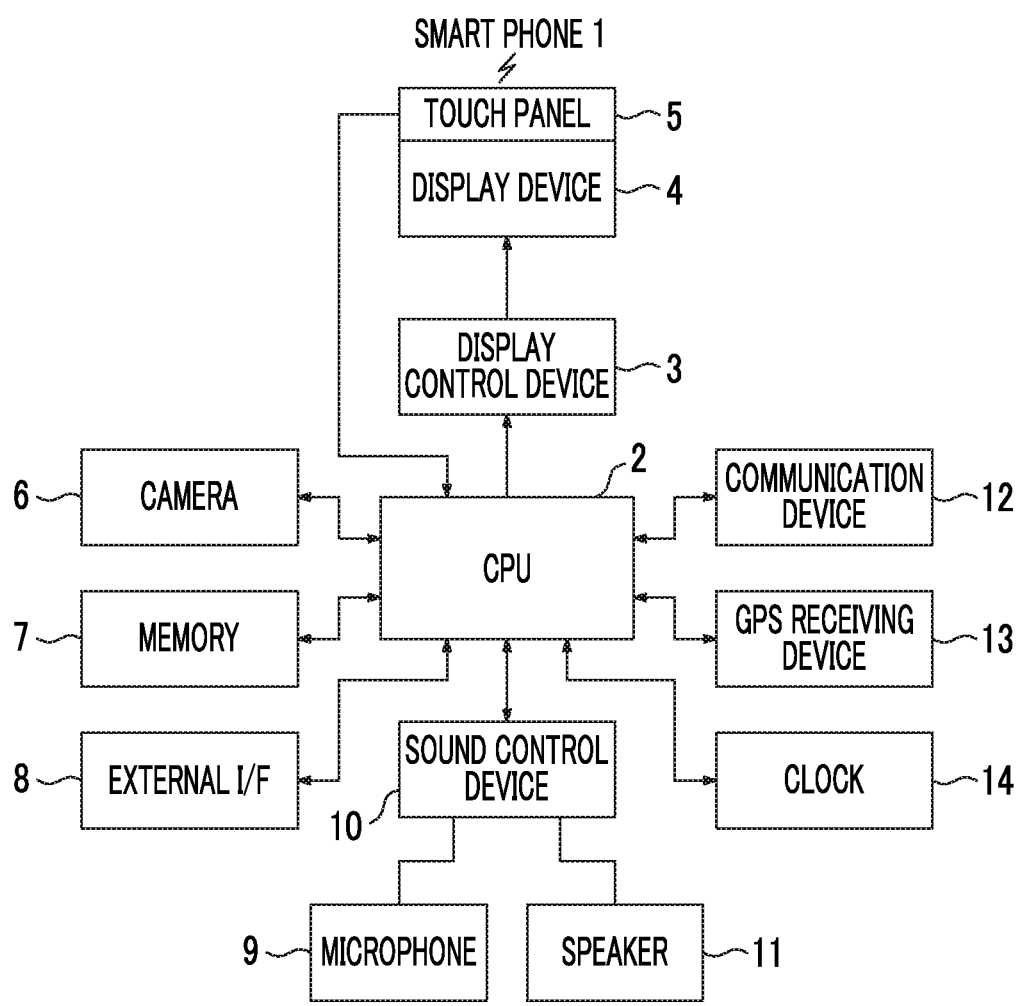
FIG. 2 is a block diagram illustrating the electrical configuration of a smart phone.

FIG. 2 is a block diagram illustrating the electrical configuration of the smart phone 1.

The overall operation of the smart phone 1 is controlled by a central processing unit (CPU) 2.

The smart phone 1 includes a display device 4 that is controlled by a display control device 3. A touch panel 5 is formed on a display screen of the display device 4. A command transmitted from the touch panel 5 is input to the CPU 2. In addition, the smart phone 1 includes a camera 6, a memory 7 that temporarily stores data, and an external interface (I/F) 8 for connection to an external device. Furthermore, the smart phone 1 includes a microphone 9, a sound control device 10, and a speaker 11. The smart phone 1 further includes a communication device 12 for connection to the internet as described above, a global positioning system (GPS) receiving device 13 that detects the position of the smart phone 1, and a clock 14.

Figure 3:
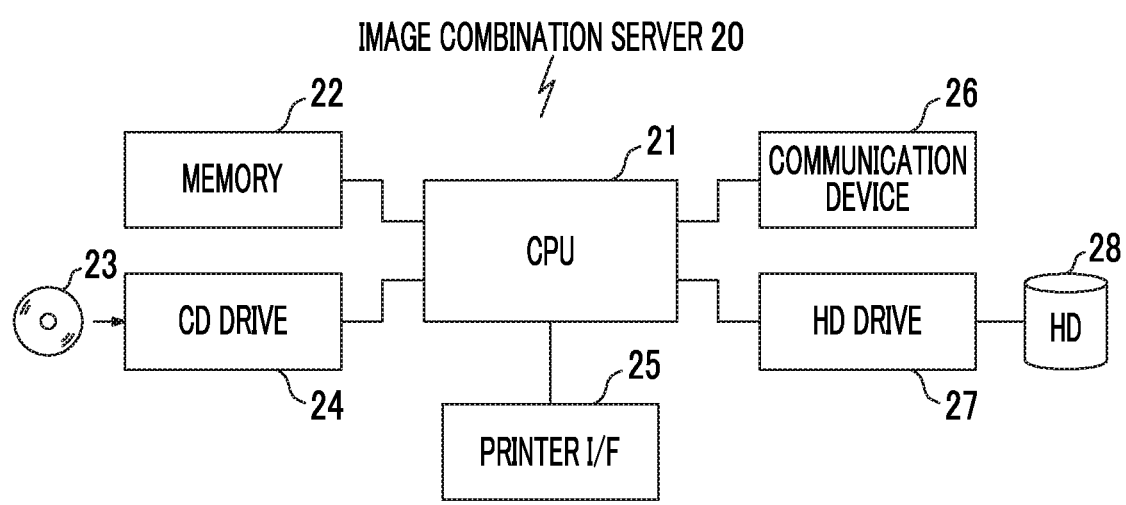
FIG. 3 is a block diagram illustrating the electrical configuration of an image combination server.

FIG. 3 is a block diagram illustrating the electrical configuration of the image combination server 20.

The overall operation of the image combination server 20 is controlled by a central processing unit (CPU 21).

The image combination server 20 includes a memory 22 that temporarily stores data, a compact disc (CD) drive 24 for access to a compact disc 23, and a printer interface (I/F) 25 that is used to connect a printer 29. In addition, the image combination server 20 includes a hard disk (HD) 28 and a hard disk drive 27 for access to the hard disk 28.

The compact disc (recording medium) 23 in which a program for controlling an operation, which will be described below, is stored is inserted into the image combination server 20 and the compact disc drive 24 reads the program stored in the compact disc 23. The read program is installed in the image combination server 20 and the image combination server 20 performs an operation which will be described below. The program for controlling the image combination server 20 may not be read from a recording medium, such as the compact disc 23, but may be received through the Internet.

Figure 4:
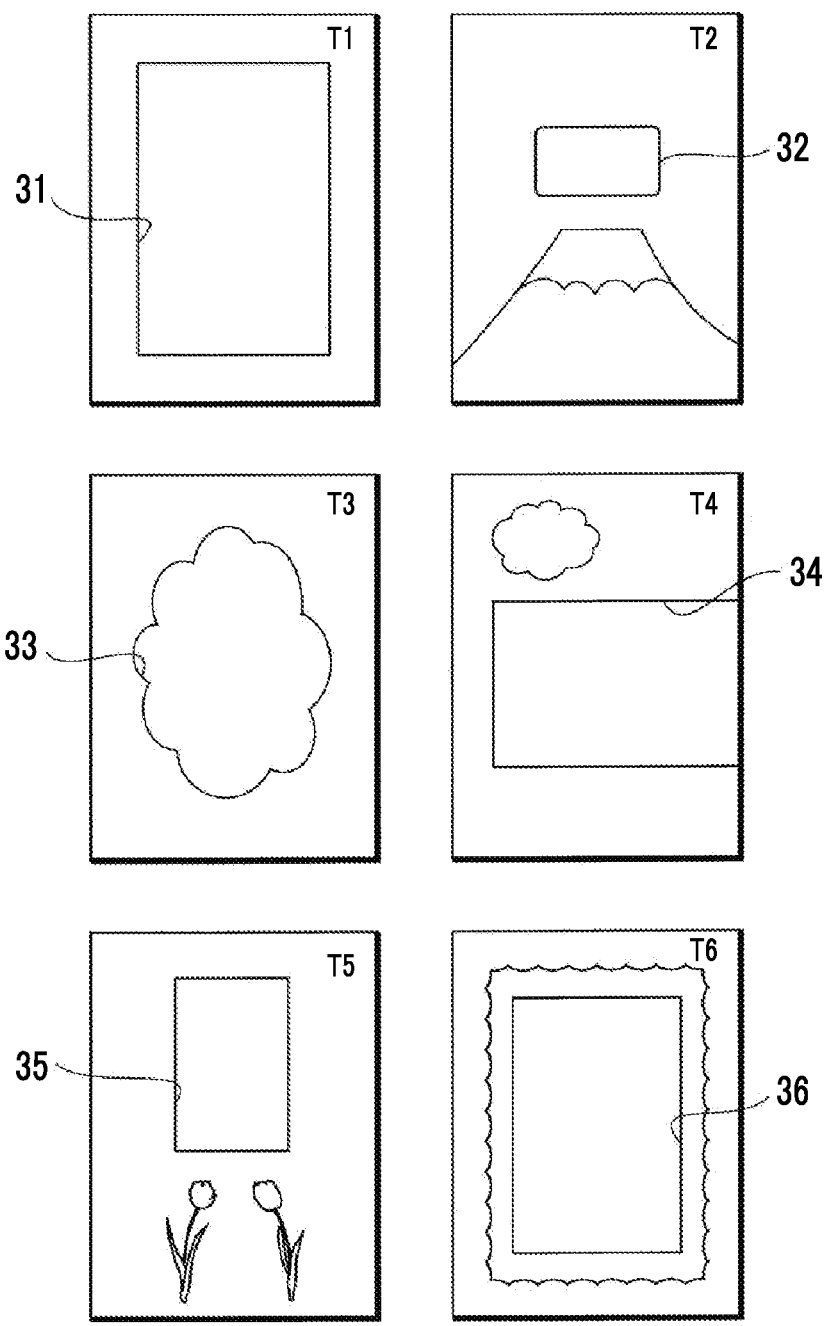
FIG. 4 illustrates an example of a template image.

FIG. 4 illustrates examples of the template image.

FIG. 4 illustrates six template images T1 to T6 as the template image. However, seven or more (five or less) template images may be provided. Image data indicating the template images T1 to T6 is stored in the hard disk 28 of the image combination server 20.

Combination regions (attachment regions) 31 to 36, with which a target image (a portion of the target image) is combined, are formed in the template images T1 to T6. One or more combination regions may be provided in one template image.

FIG. 5 illustrates an example of a template image analysis information table.

Template image analysis information is stored in the memory 22 in the table form illustrated in FIG. 5.

In the template image analysis information table, the impression (an impression such as cute, pretty, or gentle) of a template and template image analysis information are stored for each template image. Image analysis information includes brightness, contrast, chroma, a color, and a color balance. Other types of analysis information may be used. In addition, the image analysis information may include a portion of the template image analysis information illustrated in FIG. 5. In a case in which there are a plurality of impressions in the template image, the plurality of impressions are stored in the template image analysis information table.

The CPU 21 of the image combination server 20 reads image data indicating the template images stored in the hard disk 28, analyzes each template image, and obtains image analysis information. In addition, a computer other than the image combination server 20 may analyze image analysis information in advance and transmit data indicating the analyzed image analysis information to the image combination server 20. The transmitted image analysis information is stored as the template image analysis information table in the memory 22.

Figure 6:
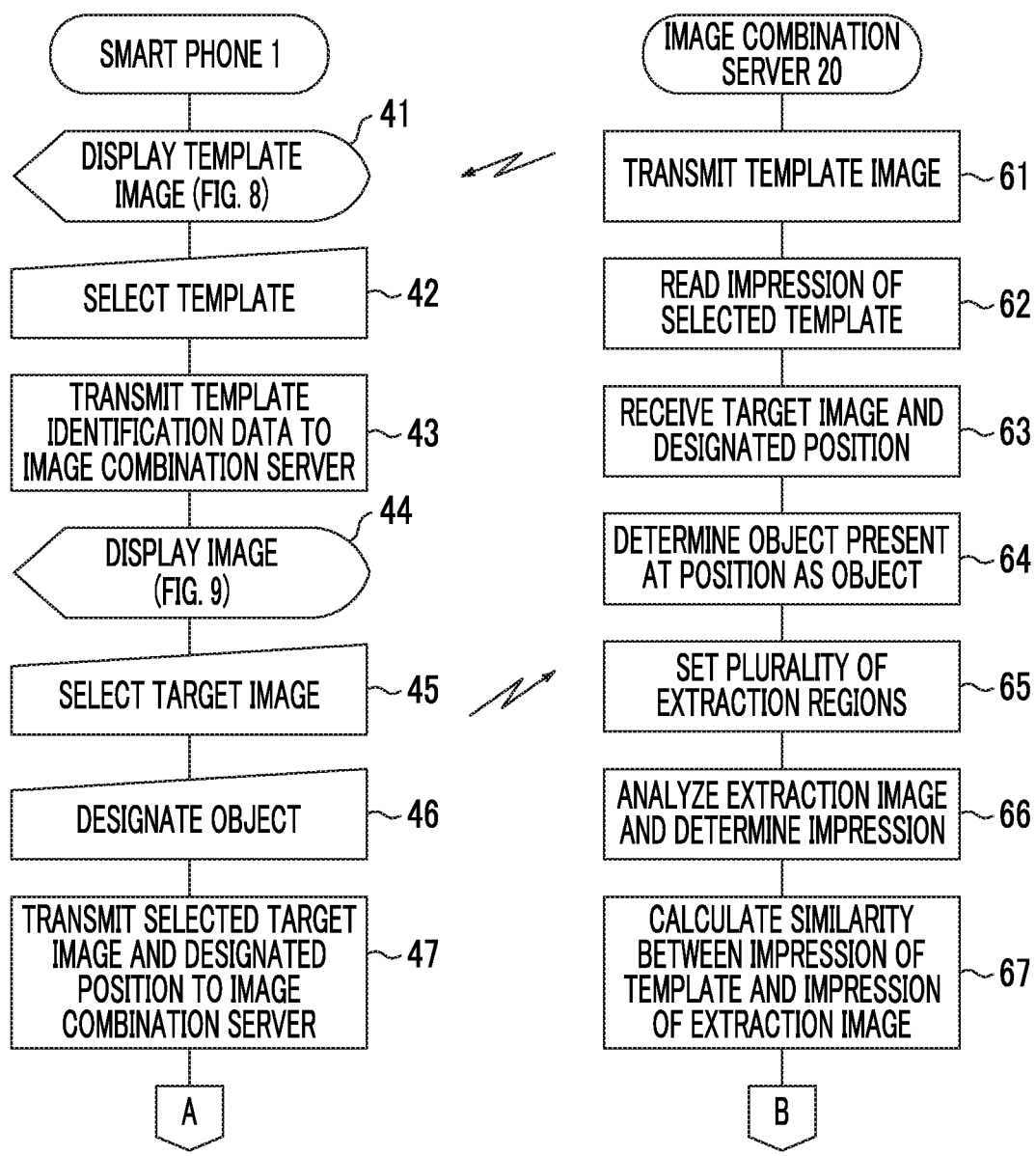
FIG. 6 is a flowchart illustrating the procedure of the image combination system.
Figure 7:
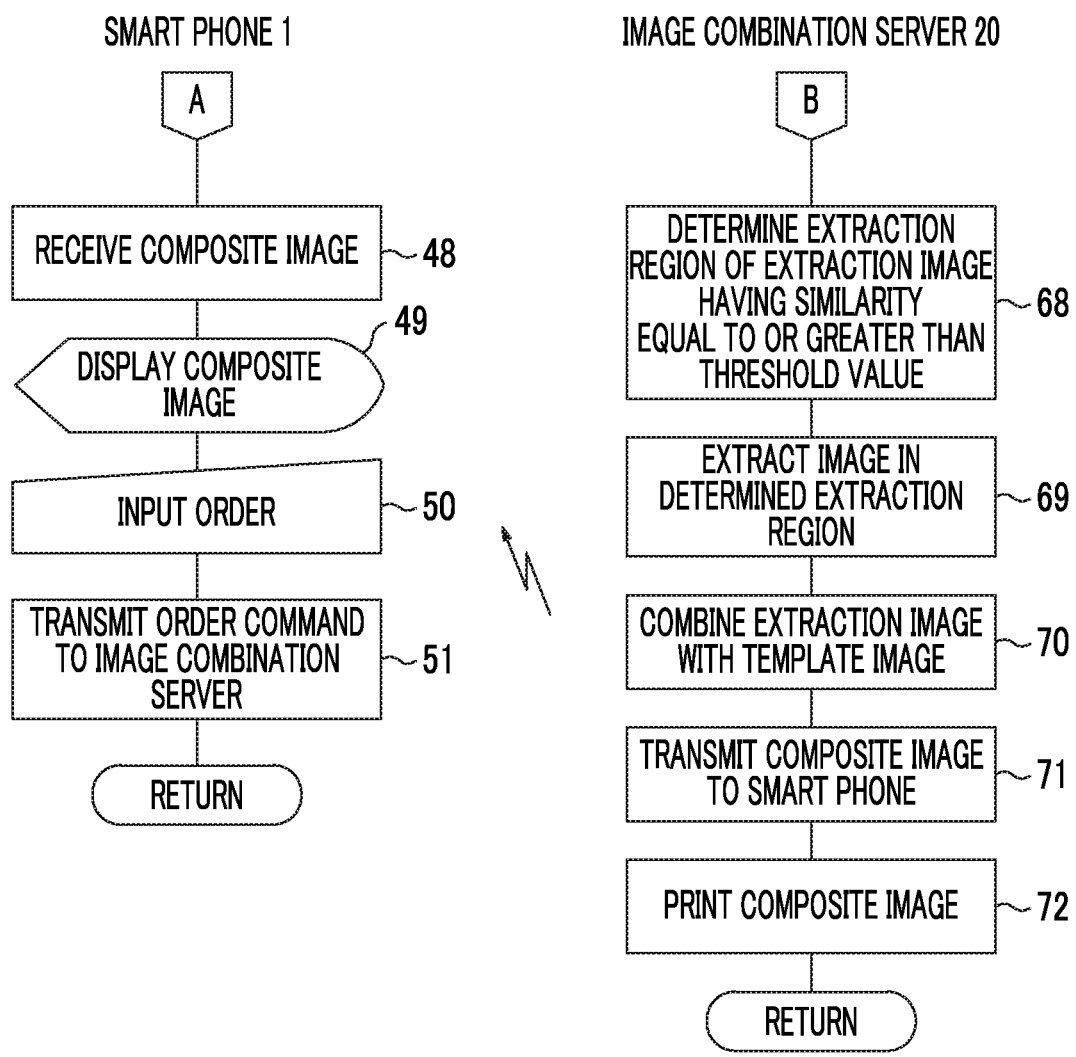
FIG. 7 is a flowchart illustrating the procedure of the image combination system.

FIGS. 6 and 7 are flowcharts illustrating the procedure of the image combination system.

In this embodiment, the user of the smart phone 1 selects a desired template image and selects a target image to be combined with the combination region of the template image. In the target image selected by the user (the CPU 21 of the image combination server 20 may determine a target image using face detection or person detection), a portion which has a high similarity to the impression of the template image and includes an object (an object to be combined with the template image) is extracted and the extracted portion is combined with the combination region of the template image (however, in a case in which not the impression of a portion of the target image but the impression of the entire target image has a high similarity to the impression of the template image, the entire target image may be combined with the combination region of the template image).

When the smart phone 1 accesses the image combination server 20, template image data stored in the hard disk 28 is transmitted from the image combination server 20 to the smart phone 1 (Step 61). When the smart phone 1 receives the template image data transmitted from the image combination server 20, a template list screen illustrated in FIG. 8 is displayed on a display screen 80 of the smart phone 1.

Figure 8:
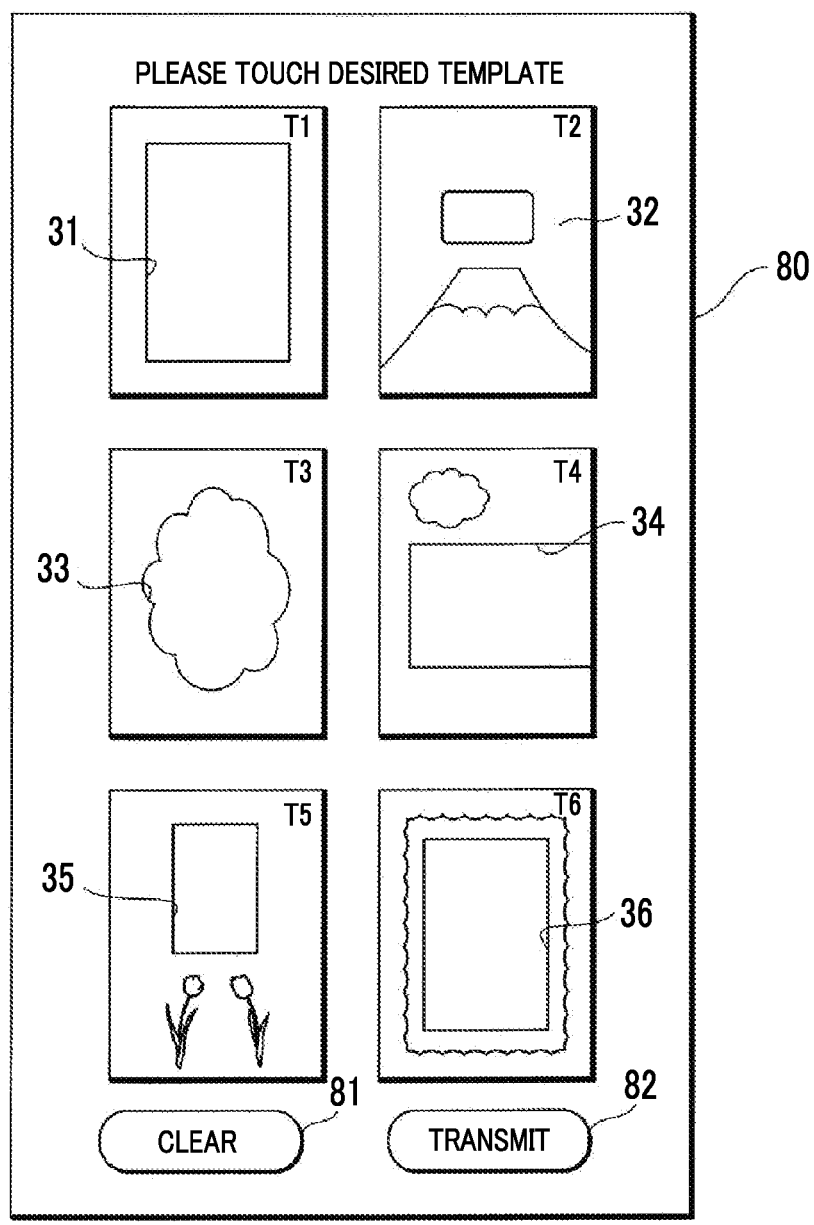
FIG. 8 illustrates an example of a display screen of the smart phone.

The template images T1 to T6 are displayed on the display screen 80 with reference to FIG. 8. In addition, in a case in which there are many template images, the display screen 80 is scrolled such that the template images which have not been displayed on the display screen 80 are displayed on the display screen 80.

A clear button 81 with letters "clear" and a transmission button 82 with letters "transmit" are displayed below the template images T1 to T6. The user touches a desired template image among the template images T1 to T6 displayed on the display screen 80 (in a case in which there are other template images, other template images). Then, the touched template image is in a selected state. In a case in which a composite image is generated using the selected template image, the user touches the transmission button 82. Then, identification data of the selected template image is transmitted from the smart phone 1 to the image combination server 20. In a case in which, after the template image is in a selected state, the user selects another template image, the user touches the clear button 81. Then, the template image in the selected state is cleared and a new template image can be selected.

Returning to FIG. 6, as described above, when the user selects a desired template image (Step 42), the identification data of the selected template image is transmitted from the smart phone 1 to the image combination server 20 (Step 43).

When the image combination server 20 receives the identification data of the template image transmitted from the smart phone 1, the central processing unit (CPU) 21 reads the impression of the template image specified by the identification data from the template image analysis information table stored in the memory 22 (Step 62). For example, it is assumed that the user of the smart phone 1 selects the template image T4. Then, "gentle" is read as the impression of the template image T4 from the template image analysis information table.

When a template image is selected, the display screen 80 of the smart phone 1 is switched to a display screen of a list of the target images to be combined with the template image (Step 44).

Figure 9:
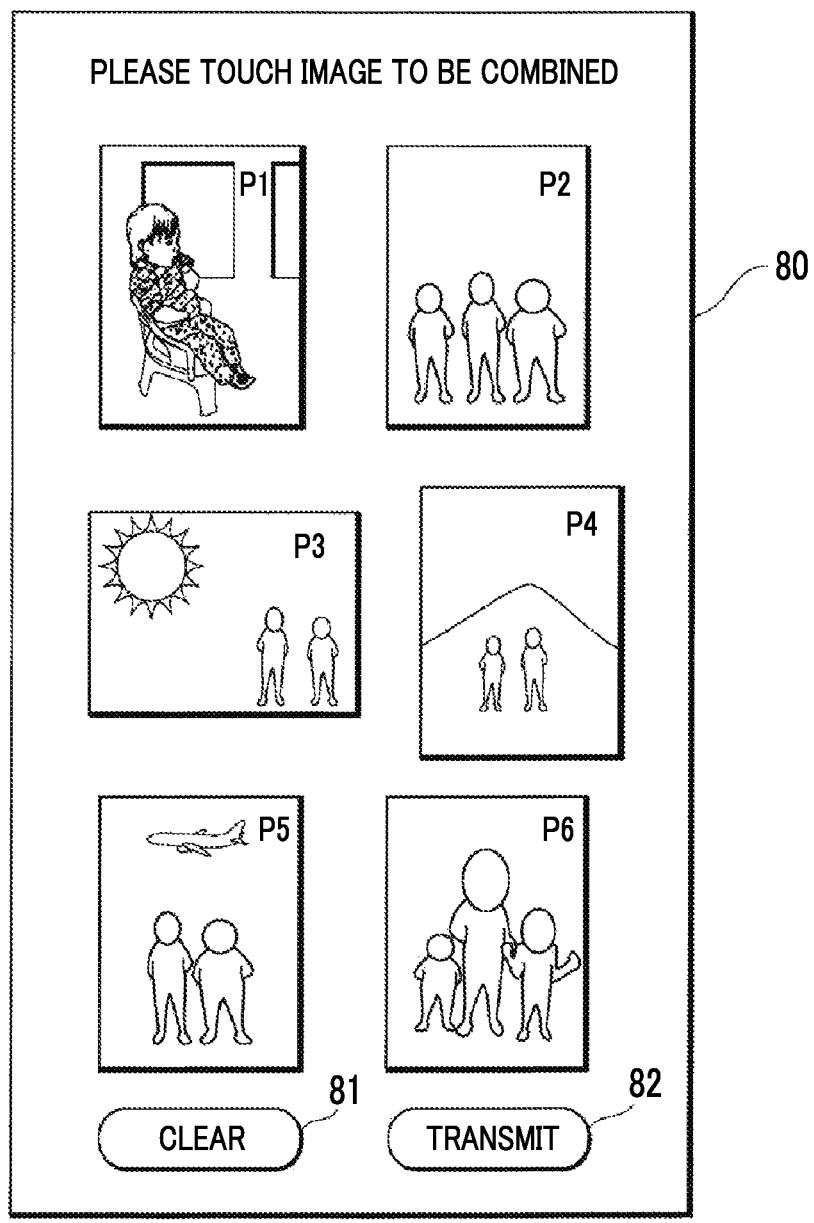
FIG. 9 illustrates an example of the display screen of the smart phone.

FIG. 9 illustrates an example of the target image list display screen.

Images P1 to P6 are displayed on the display screen 80 of the smart phone 1. Image data is stored in the memory 7 of the smart phone 1 and the images P1 to P6 indicated by the image data are displayed. The display screen 80 may be scrolled such that images which have not been displayed on the display screen 80 are displayed on the display screen 80. The clear button 81 in which letters "clear" are displayed and the transmission button 82 in which letters "transmit" are displayed are displayed in a lower part of the display screen 80.

The user touches an image to be combined with the combination region of the template image to select the target image from the images displayed on the display screen 80 (Step 45 in FIG. 6). In a case in which the user changes the selected target image, the user touches the clear button 81. Then, the selection of the image is cancelled and an image can be selected again. In this embodiment, it is assumed that the user selects the target image P1 as the target image to be combined with the combination region of the template image.

Figure 10:
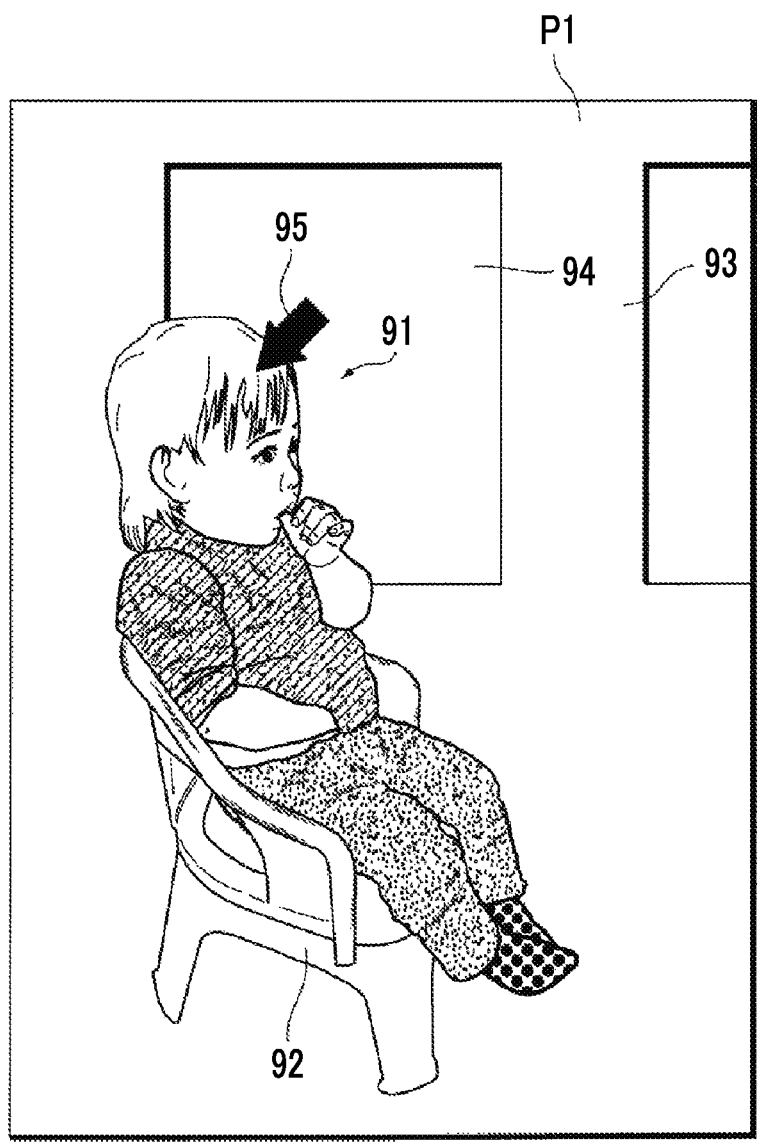
FIG. 10 illustrates an example of a target image.

FIG. 10 illustrates the target image P1.

The target image P1 is an image of a baby 91 that sits downs on a baby chair 92. In addition, in the target image P1, a window frame 93 having a window glass 94 put thereinto is included in the background.

When the user selects a target image, the user designates an object (an object to be combined with the template image) in the target image (Step 46). When the user considers the baby 91 as the object to be combined with the template image in the target image P1, the user touches an image portion of the baby 91. Then, a marker 95 is displayed on the touched portion.

Returning to FIG. 6, when the transmission button 82 is touched, image data indicating the selected target image and position specification data indicating the position selected by the user are transmitted from the smart phone 1 to the image combination server 20 (Step 47 in FIG. 6).

When the image combination server 20 receives the image data and the position specification data transmitted from the smart phone 1 (Step 63), the CPU 21 (an example of object determination unit) determines that an object which is present at the position indicated by the position specification data in the target image indicated by the received image data is the object to be combined with the template image in the target image (Step 64). In this embodiment, it is assumed that the face of the baby 91 including the position designated by the user of the smart phone 1 is determined as the object to be combined with the template image. In a case in which no object is designated by the user, the CPU 21 may perform, for example, a face detection process or a person detection process for the target image P1 selected by the user and may determine a detected face or a detected person as the object. Information about the object to be combined with the template image may be recorded in a header associated with the image data. In this case, the CPU 21 reads the information about the object from the header and determines the object.

When the object is determined, the CPU 21 sets a plurality of extraction regions which include the determined object and have a shape similar to the shape of the combination region of the template image selected by the user.

Figure 11:
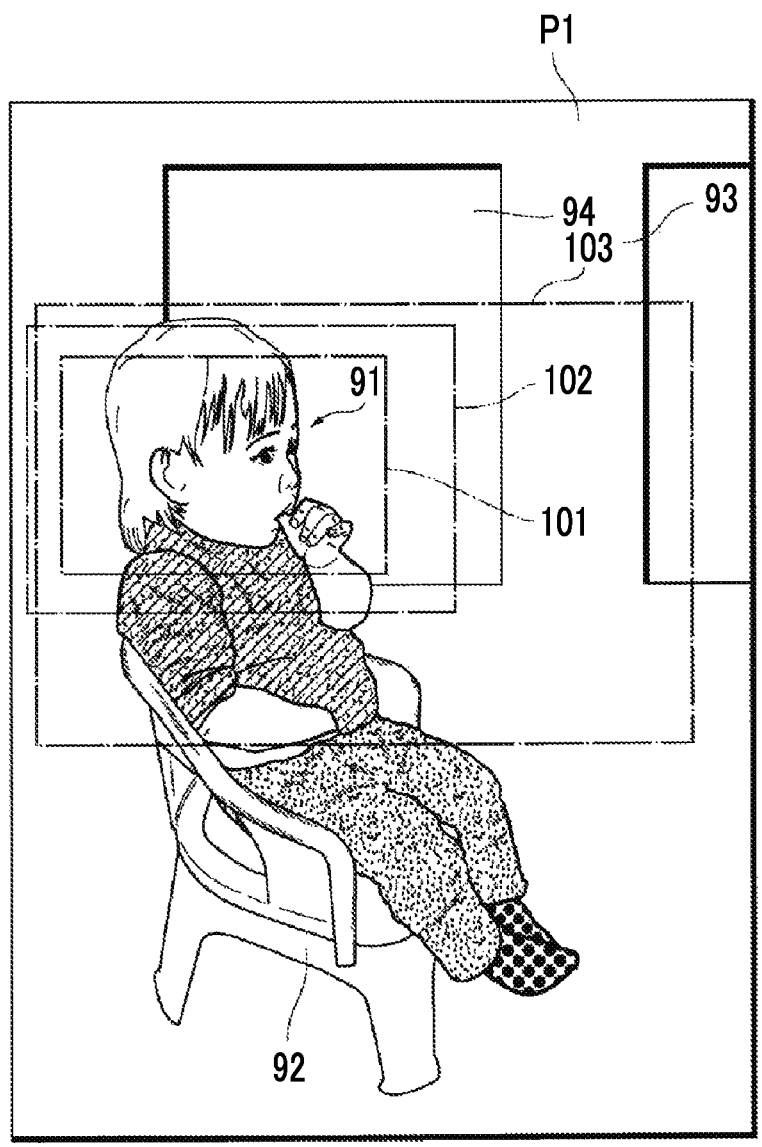
FIG. 11 illustrates an example of the target image.

FIG. 11 illustrates an example of the target image P1 in which a plurality of extraction regions are set.

The CPU 21 sets a plurality of extraction regions 101, 102, and 103 including a face region of the baby 91 as the object in the target image P1. The shape of each of the plurality of extraction regions 101, 102, and 103 is similar to the shape of a combination region 34 of the template image T4 selected by the user. Here, three extraction regions 101, 102, and 103 are set. However, two extraction regions or four or more extraction regions may be set.

Figure 12:
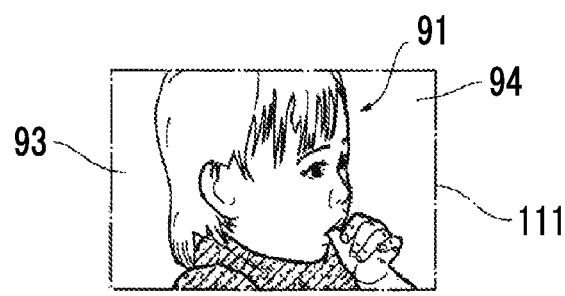
FIG. 12 illustrates an example of an extraction image.

FIG. 12 illustrates an extraction image 111 in the extraction region 101.

In the extraction image 111, the percentage of the face region of the baby 91 that is the object is high and the background includes a portion of the window frame 93 and a portion of the window glass 94.

Figure 13:
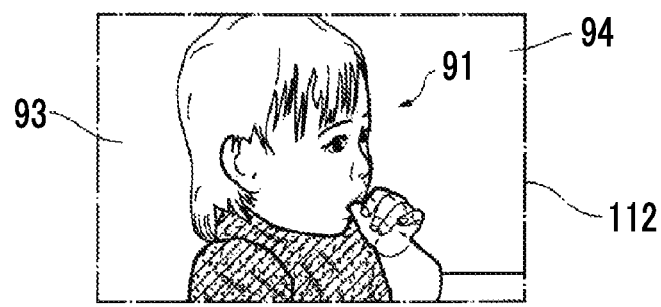
FIG. 13 illustrates an example of the extraction image.

FIG. 13 illustrates an extraction image 112 in another extraction region 102.

In the extraction image 112, the percentage of the face region of the baby 91 that is the object is lower than that in the extraction image 111 illustrated in FIG. 12 and the percentage of the window frame 93 and the window glass 94 in the background is relatively high.

Figures 14, 15:
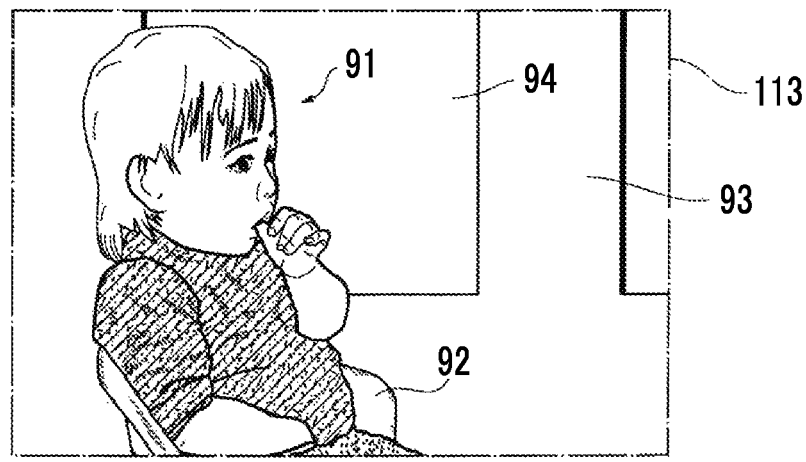
FIG. 14 illustrates an example of the extraction image.
FIG. 15 illustrates an example of an extraction image analysis information table.

FIG. 14 illustrates an extraction image 113 in still another extraction region 103.

In the extraction image 113, the percentage of the face region of the baby 91 that is the object is lower than that in the extraction image 111 illustrated in FIG. 12 and the percentage of the window frame 93 and the window glass 94 in the background is high. In addition, the extraction image 113 includes a portion of the baby chair 92 on which the baby 91 sits down.

As such, the percentages of the object (the face region of the baby 91, the baby chair 92, the window frame 93, and the window glass 94) in the extraction images 111, 112, and 113 are different from each other. Therefore, features indicating, for example, the brightness, contrast, chroma, color, and color balance of the extraction images are also different from each other.

Returning to FIG. 6, when the plurality of extraction regions 101, 102, and 103 are set, the CPU 21 analyzes the extraction images 111, 112, and 113 in the set extraction regions 101, 102, and 103 and determines the impression of the extraction images 111, 112, and 113 (Step 66).

FIG. 15 illustrates an example of an extraction image analysis information table.

In the extraction image analysis information table, the impression of an extraction image and image analysis information are stored for each of the extraction images 111, 112, and 113. The image analysis information includes, for example, the brightness, contrast, chroma, color, and color balance of the extraction image, similarly to the template image analysis information table illustrated in FIG. 5. The CPU 21 detects image analysis information of the extraction images 111, 112, and 113 and stores the detected image analysis information in the extraction image analysis information table. In addition, the CPU 21 determines the impression of each of the extraction images 111, 112, and 113 from the detected image analysis information. The relationship between the value of the image analysis information and the impression is determined in advance and the impression of each of the extraction images 111, 112, and 113 is determined from the detected image analysis information on the basis of the relationship.

As described above, since the percentages of the objects included in the extraction images 111, 112, and 113 are different from each other, the values of the image analysis information including, for example, brightness and contrast for each extraction image are different from each other and the impressions determined from the image analysis information are different from each other. Of course, in some cases, even when the values of the image analysis information are different from each other, the extraction images have the same impression.

Returning to FIG. 6, the CPU 21 calculates the similarity between the impression of the template image T4 selected by the user and the impression of each of the extraction images 111, 112, and 113 (Step 67). The similarity is calculated by a value obtained by subtracting the added value of the differences between the image analysis information of the template image and the image analysis information of the extraction image that is the same type as the image analysis information of the template image from 0. As the value obtained by subtracting the added value of the differences from 0 increases, the similarity increases. For example, brightness in the image analysis information of the template image T4 selected by the user is L7. In the image analysis information of the extraction image 111, brightness that is the same type of image analysis information as the brightness is L7. Therefore, the difference is 0. In addition, the value of the contrast in the image analysis information of the template image T4 is L6 and the value of contrast in the image analysis information of the extraction image 111 is L3. Therefore, the difference is 3. The value of chroma in the image analysis information of the template image T4 is L5 and the value of chroma in the image analysis information of the extraction image 111 is L3. Therefore, the difference is 2. When a value obtained by subtracting the added value of the differences from 0 is calculated using the image analysis information including brightness, contrast, and chroma, the calculated value is 0−(0+3+2)=−5. Similarly, a value obtained by subtracting the added value of the differences between the template image T4 and the extraction image 112 from 0 is 0−(0+3+1)=−4 and a value obtained by subtracting the added value of the differences between the template image T4 and the extraction image 113 from 0 is 0−(1+1+3)=−5. In this case, as a value obtained by subtracting the absolute value of the difference from 0 increases, the similarity increases.

The similarity may be calculated as follows.

The CPU 21 compares extraction image analysis information obtained by analyzing the extraction image with image analysis information which is the same type as the extraction image analysis information among the image analysis information items stored in the template image analysis information table and calculates the similarity for the same type of image analysis information. The similarity becomes higher as the value of the extraction image analysis information and the value of the template image analysis information become closer to each other and becomes lower as the values become further away from each other. When the extraction image analysis information and the template image analysis information which are of the same type are identical to each other, the similarity is the highest. The similarity between the image analysis information items that are of the same type in the extraction image analysis information and the template image analysis information is calculated and the added value of the calculated similarities is a total similarity (similarity). An extraction image having a total similarity equal to or greater than a threshold value is the extraction image having an impression whose similarity to the impression of the template image is equal to or greater than a threshold value.

For example, when the value of the extraction image analysis information (for example, the value of the brightness of the target image) is equal to the value of the template image analysis information (the value of the brightness of the template image), the similarity is 100%. When the value of the template image analysis information is ±10% of the value of the extraction image analysis information, the similarity is 90%. Similarly, when the value of the template image analysis information is in the range of ±20% to ±10% of the value of the extraction image analysis information, the similarity is 80%. The other values are set by the same method as described above. For image analysis information, such as a color that cannot be specified by one value, for example, the average value of the color of the extraction image is the extraction image analysis information of the color and the average value of the color of the template image is the template image analysis information of the color. The similarity between the average values of the colors is calculated. For the color balance which is the image analysis information that cannot be specified by one value, the coincidence between image analysis information (the average value of the color balance) and template image analysis information (the average value of the color balance) for each of red, blue, and green (cyan, magenta, and yellow) is the similarity. An extraction image having a total similarity, which is the added value of the calculated similarities, equal to or greater than the threshold value is the extraction image having an impression whose similarity to the impression of the template image is equal to or greater than the threshold value.

As such, the similarity between the impression of the template image and the impression of the extraction image is calculated from, for example, the coincidence between the image analysis information of the template image and the image analysis information of the extraction image. Therefore, even when an extraction image has the same impression as the template image, the similarity varies depending on the extraction image. For example, even when the impression of the template image T4 is "gentle" and the impression of each of the extraction images 111 and 112 is "gentle", the similarity between the impression of the extraction image 111 and the impression of the template image T4 is likely to be different from the similarity between the impression of the extraction image 112 and the impression of the template image T4. In addition, in some cases, the similarity between the impression "gentle" of the template image T4 and the impression "cute" of the extraction image 111 different from the impression "gentle" of the template image T4 is higher than the similarity between the impression "gentle" of the template image T4 and the impression "gentle" of the extraction image 112 which is the same as the impression "gentle" of the template image T4.

In this way, the CPU 21 calculates the similarity (Step 67). Then, the CPU 21 (extraction region determination unit) determines an extraction region of the extraction image having a similarity equal to or greater than the threshold value (Step 68). As described above, in a case in which the similarity between the impression of the template image and the impression of the extraction image is calculated on the basis of the value obtained by subtracting the added value of the differences between the image analysis information of the template image and the image analysis information of the extraction image which is the same type as the image analysis information of the template image from 0, when the threshold value is, for example, −4, an extraction image having a similarity equal to or greater than the threshold value is the extraction image 112 among the extraction images 111, 112, and 113 and the extraction region 102 is determined. An extraction image having an impression closest to the impression of the template image T4 selected by the user is the extraction image 112. In addition, in a case in which there are two or more extraction images having a similarity equal to or greater than the threshold value, the extraction regions of two or more extraction images may be determined. The CPU 21 extracts the extraction image (in this case, the extraction image 112) in the determined extraction region from the target image P1 (Step 69). In a case in which the extraction region is not determined but the extraction image is directly determined, the outer periphery of the extraction image is regarded as the extraction region. Therefore, in this case, the extraction region is also determined.

The CPU 21 (image combination unit) combines the extraction image 112 in the determined extraction region 102 with the combination region 34 of the template image T4 selected by the user and generates a composite image (Step 70). Since the composite image is generated using the extraction image 112 with an impression close to the impression of the template image T4 selected by the user, the overall balance of the composite image is natural.

Image data indicating the generated composite image is transmitted from the image combination server 20 to the smart phone 1 (Step 71).

When the smart phone 1 receives the image data indicating the composite image transmitted from the image combination server 20 (Step 48), the composite image is displayed on the display screen 80 of the smart phone 1 (Step 49).

Figure 16:
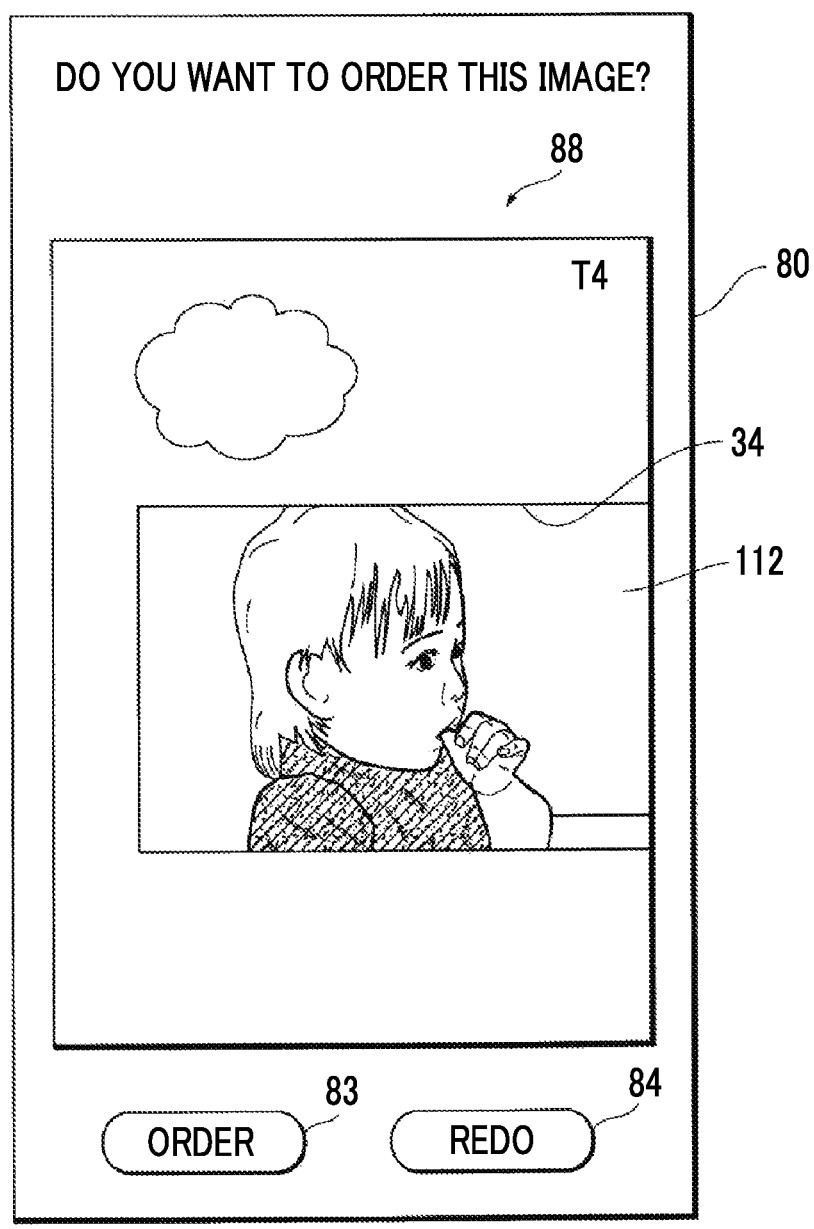
FIG. 16 illustrates an example of the display screen of the smart phone.

FIG. 16 illustrates an example of the display screen 80 of the smart phone 1.

A composite image 88 generated in the image combination server 20 is displayed on the display screen 80. An order button 83 in which letters "order" are displayed and a redo button 84 in which letters "redo" are displayed are formed below the composite image 88. When the user of the smart phone 1 views the composite image 88 and orders a print of the composite image 88, the user touches the order button 83. When the user is dissatisfied with the composite image 88 displayed on the display screen 80, the user touch the redo button 84. Then, a composite image is generated again using the extraction images other than the extraction image 112 used to generate the composite image 88.

Returning to FIG. 7, when the user of the smart phone 1 touches the order button 83 (Step 50), an order command is transmitted from the smart phone 1 to the image combination server 20 (Step 51).

When the image combination server 20 receives the order command transmitted from the smart phone 1, the printer 29 prints the generated composite image 88 (Step 72). The print of the composite image 88 is sent to the user of the smart phone 1.

FIG. 17 illustrates an example of a similarity table.

In the above-described embodiment, the similarity between the impression of the template image and the impression of the extraction image is calculated using the image analysis information. However, the similarity may be calculated using the similarity table.

The similarity table defines the similarity between the impression of the template image and the impression of the extraction image. The similarity between the impressions of the same type is 1.0. The similarity between the impressions of different types becomes higher as the impressions are considered to be closer to each other. For example, the similarity between the "cute" impression and the "gentle" impression is 0.9 and the similarity between the "cute" impression and a "pleasant" impression is 0.8. Similarly, the similarities between the other impressions are known. The similarity between the impression of the template image and the impression of the extraction image is obtained using the similarity table and an extraction region of an extraction image having a similarity equal to or greater than the threshold value (for example, equal to or greater than 0.85) is determined as described above.

As such, it is possible to calculate the similarity between the impression of the template image and the impression of the extraction image, using the similarity table, and to determine an extraction region of an extraction image with an impression of which the calculated similarity is equal to or greater than the threshold value.

Figure 18:
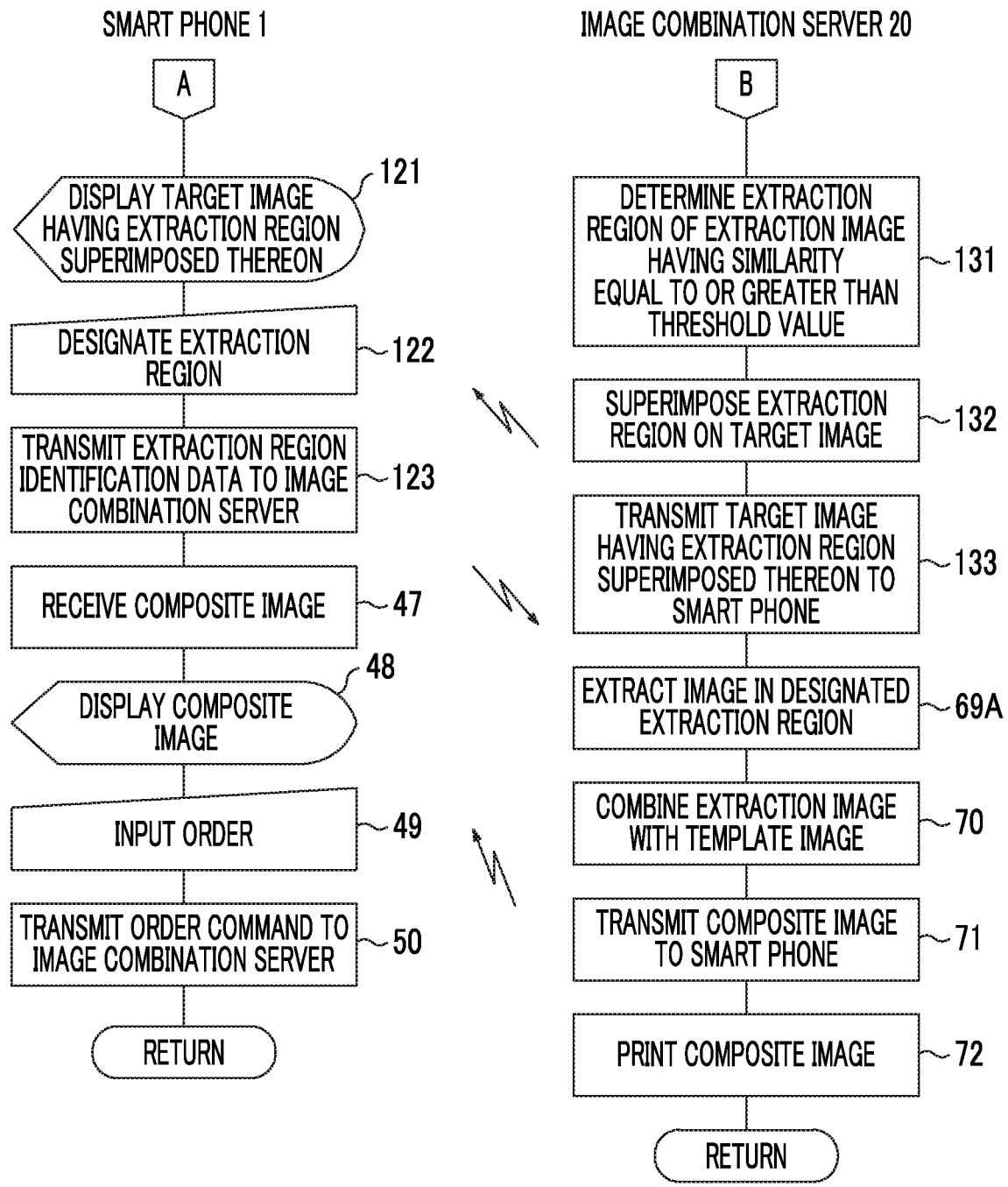
FIG. 18 is a flowchart illustrating a portion of the procedure of the image combination system.

FIG. 18 is a flowchart illustrating a portion of the procedure of the image combination system.

In the procedure illustrated in FIG. 18, as described above, in a case in which there are a plurality of extraction regions of the extraction images having a similarity equal to or greater than the threshold value, the plurality of extraction regions are notified to the user of the smart phone 1. It is assumed that the similarity between the impression of the extraction image 111 in the extraction region 101 and the impression of the template image T4 is equal to or greater than the threshold value and the similarity between the impression of the extraction image 112 in the extraction region 102 and the impression of the template image T4 is equal to or greater than the threshold value. In this case, the extraction regions 101 and 102 are determined as the extraction regions of the extraction images having a similarity equal to or greater than the threshold value (Step 131). The CPU 21 performs a superimposition process of superimposing the determined extraction regions 101 and 102 on the target image P1 (Step 132) and image data indicating a superimposed image in which the extraction regions 101 and 102 are superimposed on the target image P1 is transmitted from the communication device 26 of the image combination server 20 to the smart phone 1 (Step 133).

When the smart phone 1 receives the image data indicating the superimposed image transmitted from the image combination server 20, the target image P1 on which the extraction regions 101 and 102 have been superimposed is displayed on the display screen 80 of the smart phone 1 (Step 121). The CPU 21 and the communication device 26 (first display control unit) of the image combination server 20 superimpose the extraction region on the target image and display the superimposed image on the display screen 80.

Figure 19:
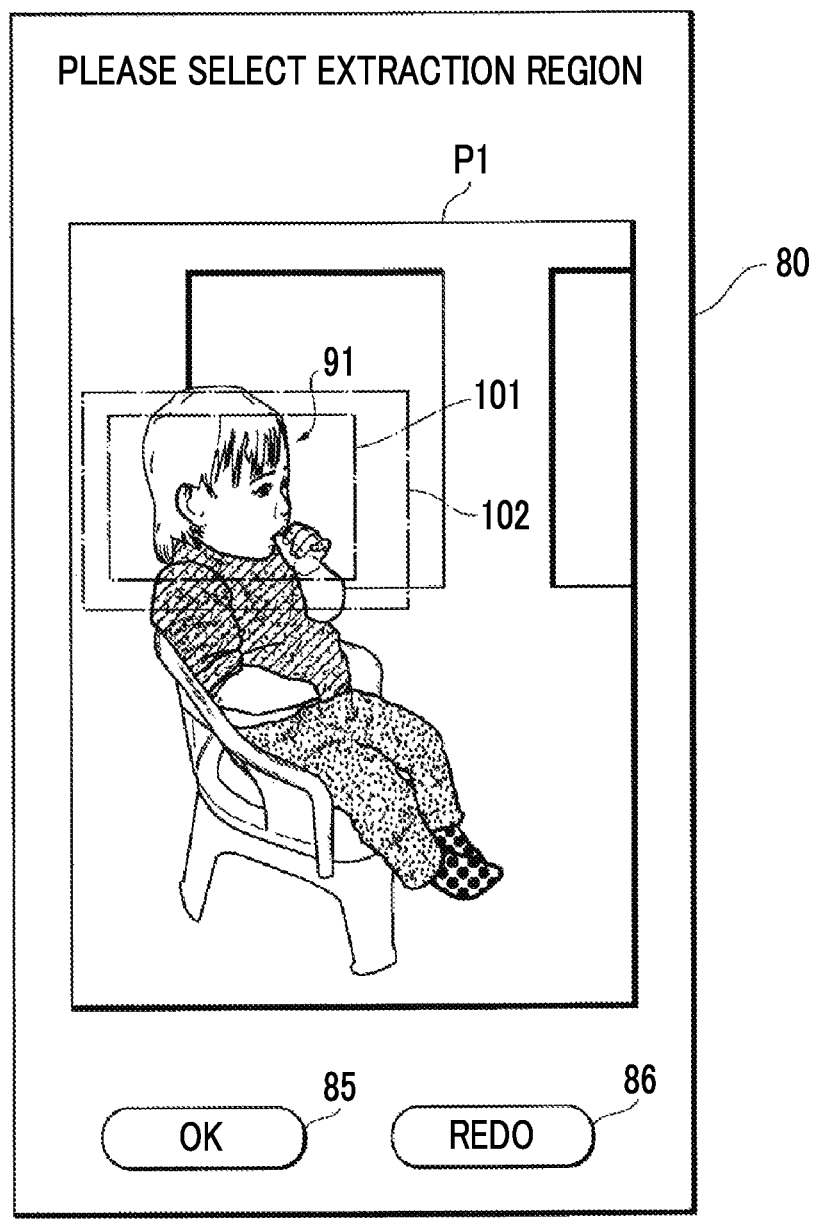
FIG. 19 illustrates an example of the display screen of the smart phone.

FIG. 19 illustrates an example of the superimposed image.

The extraction regions 101 and 102 are superimposed on the target image P1. An OK button 85 with letters "OK" and a redo button 86 with letters "redo" are displayed are formed below the target image P1.

The user of the smart phone 1 touches a desired extraction region of the extraction regions 101 and 102 superimposed on the target image P1 on the touch panel 5 to designate one of the extraction regions (Step 122 in FIG. 18) (designation unit). When the user touches the OK button 85 after designating one of the extraction regions, the identification data of the designated extraction region is transmitted from the smart phone 1 to the image combination server 20 (Step 123 in FIG. 18). When the redo button 86 is touched, data indicating that the redo button 86 has been touched is transmitted from the smart phone 1 to the image combination server 20. For example, the process is redone from the selection of the template image.

When the image combination server 20 receives the identification data transmitted from the smart phone 1, the CPU 21 extracts the extraction image in the extraction region which has been designated by the user of the smart phone 1 and is specified by the identification data (Step 69A). Then, similarly to the above, the CPU 21 combines the extraction image with the combination region 34 of the template image T4 (Step 70) and image data indicating a composite image is transmitted from the image combination server 20 to the smart phone 1 (Step 71).

As described above, the smart phone 1 receives the image data indicating the composite image and the composite image is displayed on the display screen 80 (Steps 47 and 48). When the user of the smart phone 1 touches the order button (Step 49), an order command is transmitted from the smart phone 1 to the image combination server 20 (Step 50).

When the image combination server 20 receives the order command from the smart phone 1, the printer 29 prints the composite image (Step 72).

Figure 20:
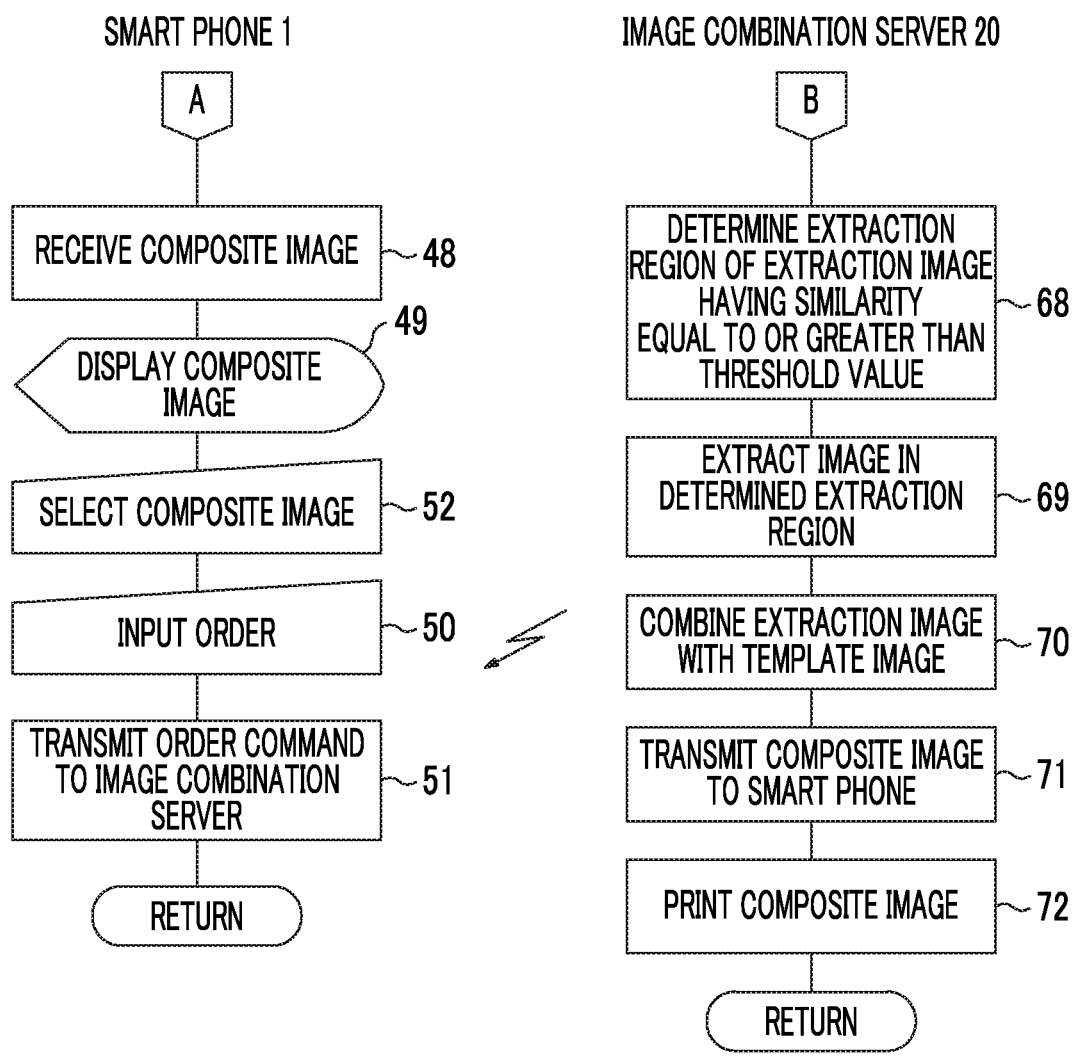
FIG. 20 is a flowchart illustrating a portion of the procedure of the image combination system.
Figure 21:
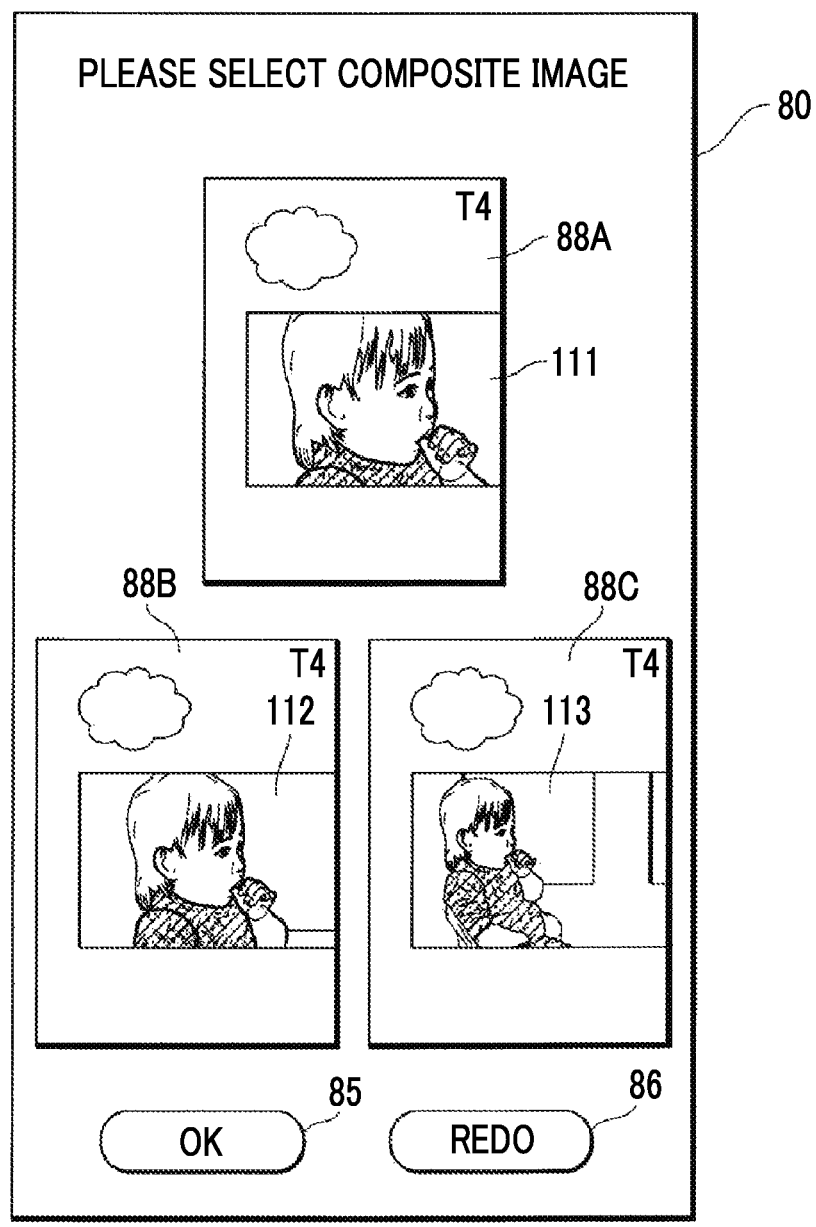
FIG. 21 illustrates an example of the display screen of the smart phone.

FIGS. 20 and 21 illustrate another embodiment.

FIG. 20 is a flowchart illustrating a portion of the procedure of the image combination system and FIG. 21 illustrates an example of the display screen 80 of the smart phone 1.

An extraction region of an extraction image having a similarity equal to or greater than the threshold value is determined (Step 68). An image in the determined extraction region is extracted (Step 69). The extracted image is combined with the combination region 34 of the template image T4 (Step 70). In a case in which there are a plurality of extraction images having a similarity equal to or greater than the threshold value, a plurality of composite images are generated using all of the extraction images. For example, when all of the extraction images 111, 112, and 113 have a similarity equal to or greater than the threshold value, three composite images are generated using all of the extraction images 111, 112, and 113. Image data indicating the generated composite images is transmitted from the image combination server 20 to the smart phone 1 (Step 71).

When the smart phone 1 receives the image data indicating the composite image (Step 48), the composite image is displayed on the display screen 80 (Step 49).

Three composite images 88A, 88B, and 88C generated as described above are displayed on the display screen 80 with reference to FIG. 21. In the composite image 88A, the extraction region 101 and the extraction image 111 are combined with the combination region 34 of the template image T4. In the composite image 88B, the extraction region 102 and the extraction image 112 are combined with the combination region 34 of the template image T4. In the composite image 88C, the extraction region 103 and the extraction image 113 are combined with the combination region 34 of the template image T4. The CPU 21 and the communication device 26 (first display control unit) of the image combination server 20 superimpose the extraction region on the target image and display a superimposed image. The user of the smart phone 1 touches a desired composite image among the composite images 88A, 88B, and 88C and selects the composite image (Step 52 in FIG. 20). When the OK button 85 is touched, an order is input (Step 50 in FIG. 20). The order command and identification data indicating the designated composite image are transmitted to the image combination server 20 (Step 51 in FIG. 20).

When the image combination server 20 receives the order command and the identification data indicating the designated composite image, the composite image specified by the identification data is printed (Step 72).

Figure 22:
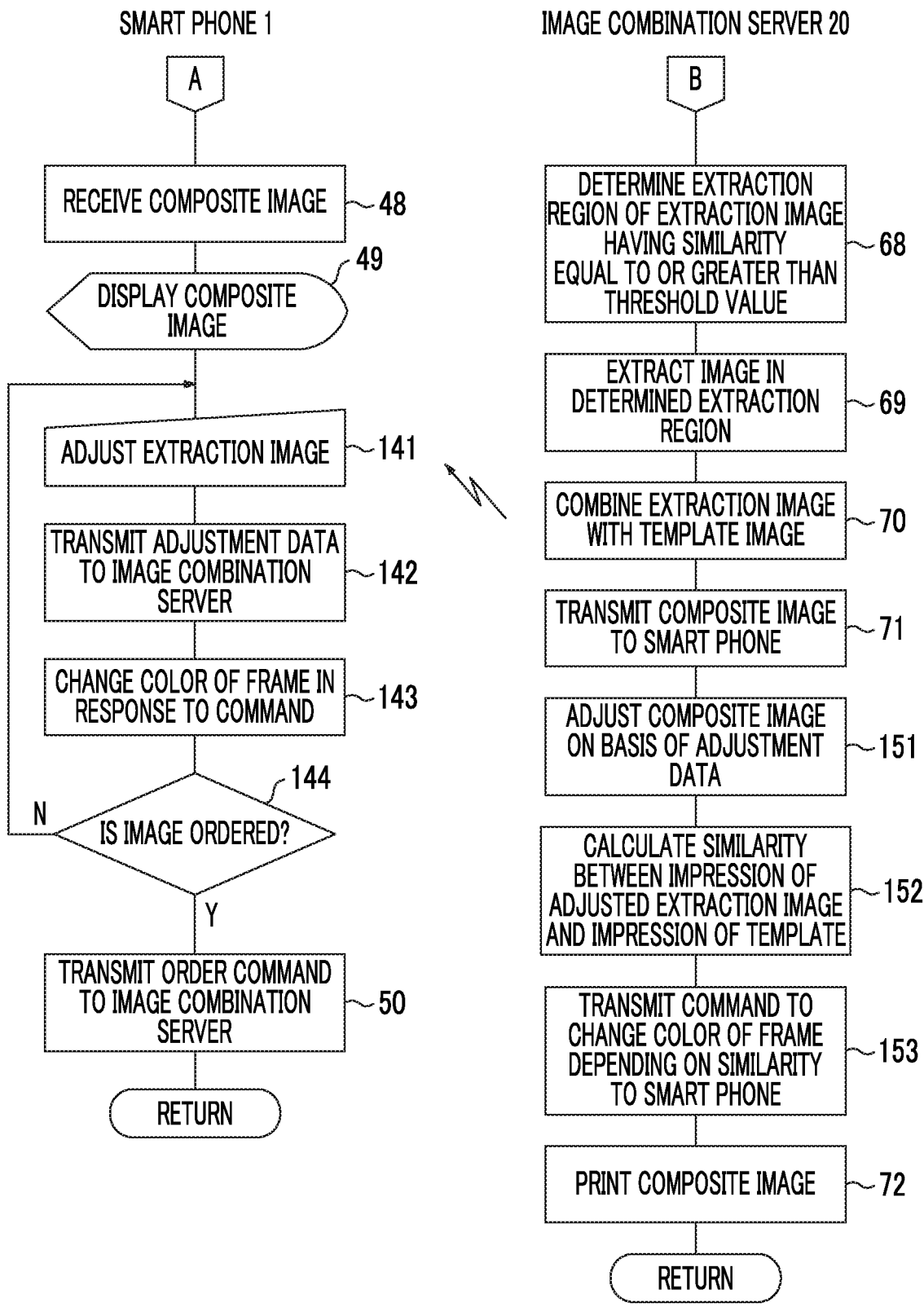
FIG. 22 is a flowchart illustrating a portion of the procedure of the image combination system.

FIG. 22 illustrates still another embodiment and is a flowchart illustrating the procedure of the image combination system. In this embodiment, the user of the smart phone 1 adjusts the extraction image combined with the template image T4. In the process illustrated in FIG. 22, for example, the same steps as those illustrated in FIG. 7 are denoted by the same reference numerals and the description thereof will not be repeated.

As described above, the extraction image 112 is combined with the combination region 34 of the template image T4 and image data indicating a composite image is transmitted from the communication device 26 of the image combination server 20 to the smart phone 1 under the control of the CPU 21 (Steps 68 to 71). The composite image 88 illustrated in FIG. 16 is displayed on the display screen 80 of the smart phone 1 (Steps 48 and 49) (the CPU 21 and the communication device 26 are second display control unit).

The user of the smart phone 1 inputs at least one adjustment command among a position adjustment command, an enlargement command, a reduction command, and a rotation command for the extraction image 112, using the touch panel 5 of the smart phone 1 (Step 141). For example, when the user drags the extraction image 112, the position adjustment command is input to the smart phone 1. The user spreads two fingers apart on the extraction image 112 to input the enlargement command to the smart phone 1. The user pinches two fingers together on the extraction image 112 to input the reduction command to the smart phone 1. The user rotates the extraction image 112 with a finger to input the rotation command to the smart phone 1. The size of the extraction image 112 is equal to the size of the combination region 34. Therefore, when the extraction image 112 is reduced or rotated, a blank is likely to be generated in the combination region 34. For this reason, in a case in which the extraction image is reduced or rotated, adjustment is performed using the target image P1 stored in the smart phone 1. Adjustment data (for example, the amount of movement, a moving direction, a reduction ratio, an enlargement ratio, and the amount of rotation) indicating a situation after adjustment is transmitted from the smart phone 1 to the image combination server 20 (Step 142).

When the communication device 26 (adjustment command input unit) of the image combination server 20 receives the adjustment data, the CPU 21 of the image combination server 20 performs the same adjustment as the user of the smart phone 1, on the basis of the adjustment data (Step 151). An image analysis process is performed for the adjusted extraction image and the CPU 21 (first calculation unit) calculates the similarity between the impression of the adjusted extraction image and the impression of the template image T4, as described above (Step 152). When the similarity is calculated, the CPU 21 of the image combination server 20 generates a command to change the color of the frame of the combination region 34 on the basis of the calculated similarity and the command is transmitted from the communication device 26 (notification unit) to the smart phone 1 (Step 153). For example, the image combination server 20 transmits, to the smart phone 1, a command to change the color of the frame such that the color of the frame becomes closer to blue as the similarity becomes higher, becomes closer to yellow as the similarity becomes closer to the median, and becomes closer to red as the similarity becomes lower.

When the command is transmitted from the image combination server 20 to the smart phone 1, the color of the frame in the composite image displayed on the display screen 80 of the smart phone 1 is changed in response to the command (Step 143). When the order button 83 is touched (YES in Step 144), order data is transmitted from the smart phone 1 to the image combination server 20 (Step 50). In a case in which the user of the smart phone 1 readjusts the extraction image, the process is repeated from Step 141.

In the above-described embodiment, the color of the frame varies depending on the similarity. However, the thickness of a frame border or the type of frame border may change depending on the similarity. As the similarity becomes higher, the frame border may become thicker. As the similarity becomes lower, the frame border may become thinner. When the similarity is high, the type of frame border may be a solid line. When the similarity is low, the type of frame border may be a chain line. In addition, instead of changing, for example, the color of the frame border to notify the similarity, the image combination server 20 may transmit the similarity to the smart phone 1 to notify the similarity.

Figure 23:
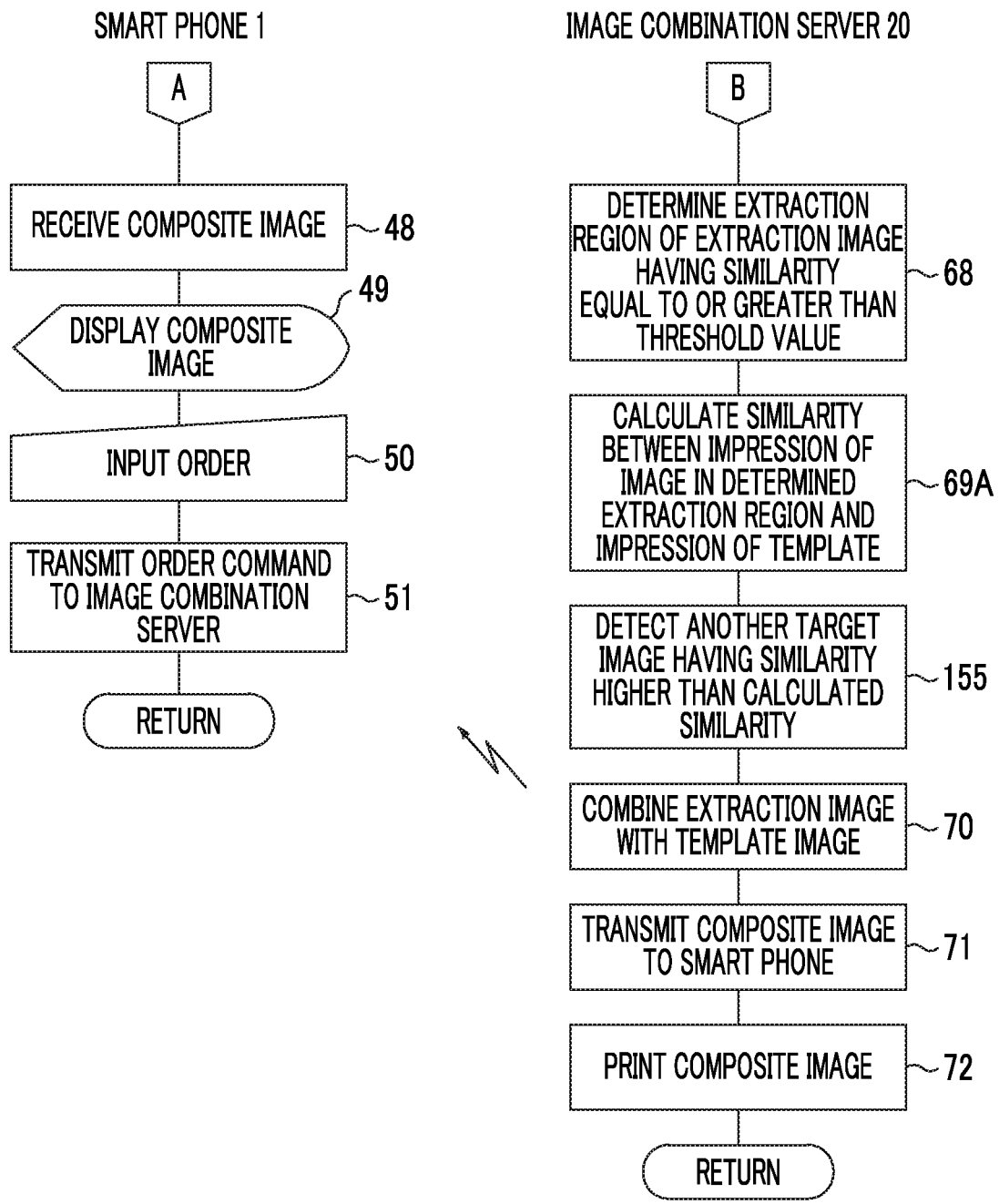
FIG. 23 is a flowchart illustrating a portion of the procedure of the image combination system.

FIG. 23 illustrates yet another embodiment and is a flowchart illustrating the procedure of the image combination system. In this embodiment, the same steps as those illustrated in FIG. 7 are denoted by the same reference numerals and the description thereof will not be repeated. In this embodiment, another target image (another target image different from the target image P1 selected by the user of the smart phone 1) having a similarity higher than the above-mentioned similarity is detected. In addition, the CPU 21 calculates the similarity between the impression of the extraction image in the determined extraction region and the impression of the template image (second calculation unit). The calculated similarity may be read.

In the above-described embodiment, only one target image P1 to be combined with the template image is selected and only image data indicating the selected target image P1 is transmitted from the smart phone 1 to the image combination server 20. However, in this embodiment, the target image P1 selected as described above is transmitted as a first composite image candidate to the image combination server 20. Another image (one image or a plurality of images) other than the target image P1 is selected by the user of the smart phone 1 and is transmitted as the next composite image candidate from the smart phone 1 to the image combination server 20. The similarity is calculated for the target image P1 which has been transmitted as the first composite image candidate to the image combination server 20, as described above, and an extraction region of an extraction image having a similarity equal to or greater than the threshold value is determined (Step 68). In addition, the CPU 21 calculates the similarity between the impression of the extraction image in the determined extraction region and the impression of the template image (Step 69A; second calculation unit). The CPU 21 detects an image including an extraction image having a similarity higher than the calculated similarity as the next composite image candidate from other transmitted images (Step 155) (target image detection unit).

Figure 24:
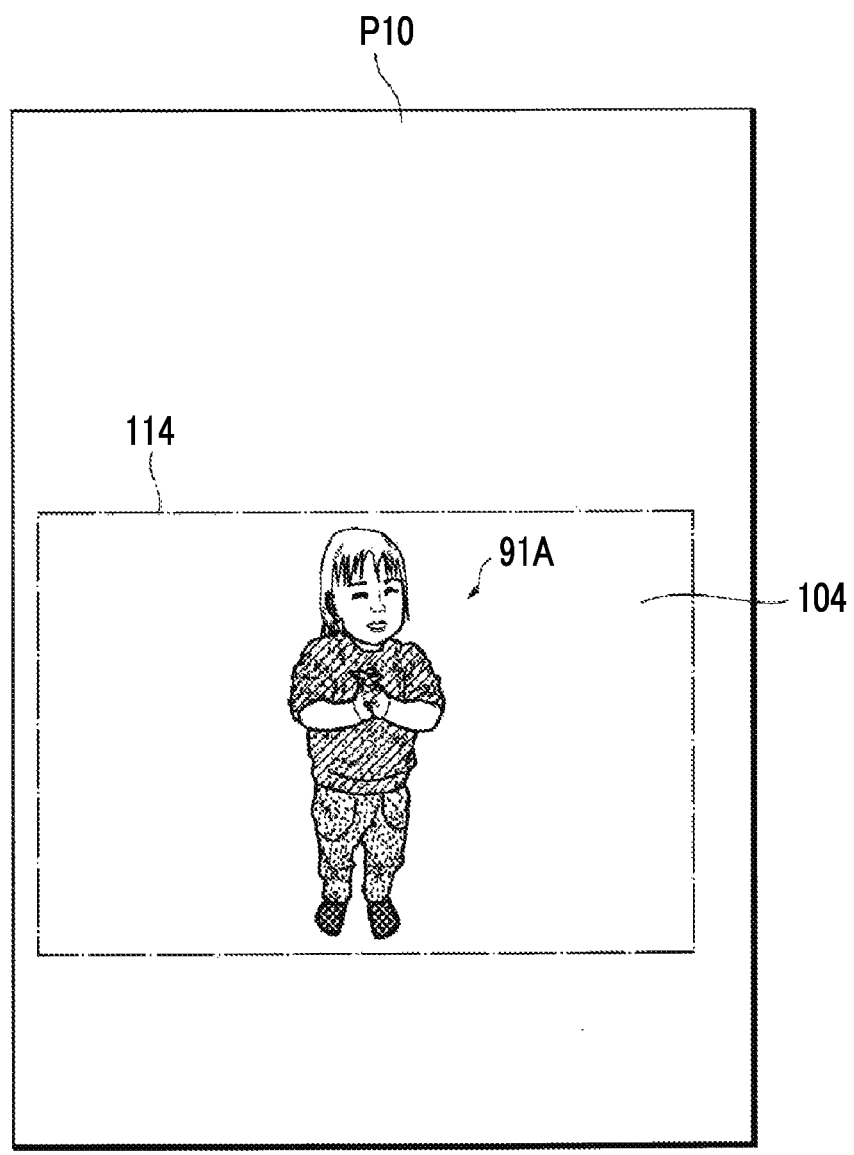
FIG. 24 illustrates an example of the display screen of the smart phone.

For example, it is assumed that an image P10 illustrated in FIG. 24 is selected as the next composite image candidate by the user of the smart phone 1 and is transmitted to the image combination server 20. The CPU 21 sets an extraction region 104 (or a plurality of extraction regions) which includes an object 91A in the image P10 and has a shape similar to the shape of the combination region 34 of the selected template image T4. Image analysis is performed for the extraction image 114 in the set extraction region 104 as described above to obtain image analysis information and an impression is also determined. The similarity between the impression of the extraction image 114 and the impression of the template image T4 is calculated, using, for example, the obtained image analysis information and impression. When the calculated similarity is higher than the similarity obtained from the target image P1 which is the first composite image candidate, not the extraction image 112 determined from the target image P1 but the determined extraction image 114 determined from the image P10, which is the next composite image candidate, is combined with the combination region 34 (Step 70). The user of the smart phone 1 may designate the object to be detected from the image P10 which has been selected as the next candidate by the user of the smart phone 1 before the image P10 is transmitted from the smart phone 1 to the image combination server 20. Alternatively, the CPU 21 of the image combination server 20 may detect the object from the image P10, using, for example, face detection or person detection. In general, the image P10 including the object 91A that is the same as the object (baby) 91 included in the target image P1 as the first composite image candidate is used as the next composite image candidate. However, the objects may not be necessarily the same.

When a composite image is generated using the extraction image 114 of the next composite image candidate P10 in this way, the same process as described above is performed. Therefore, the description of the process will not be repeated. In a case in which the user of the smart phone 1 is not satisfied with the composite image generated using the next composite image candidate P10, a composite image may be generated using the target image P1 designated as the first composite image candidate.

In the above-described embodiment, the extraction image 112 whose similarity to the impression of the template image T4 is equal to or greater than the threshold value is combined with the combination region 34 of the template image T4. However, an extraction image having the same impression as the selected template image may be combined with the combination region of the template image. In this case, the same processes as described above are performed.

Figure 25:
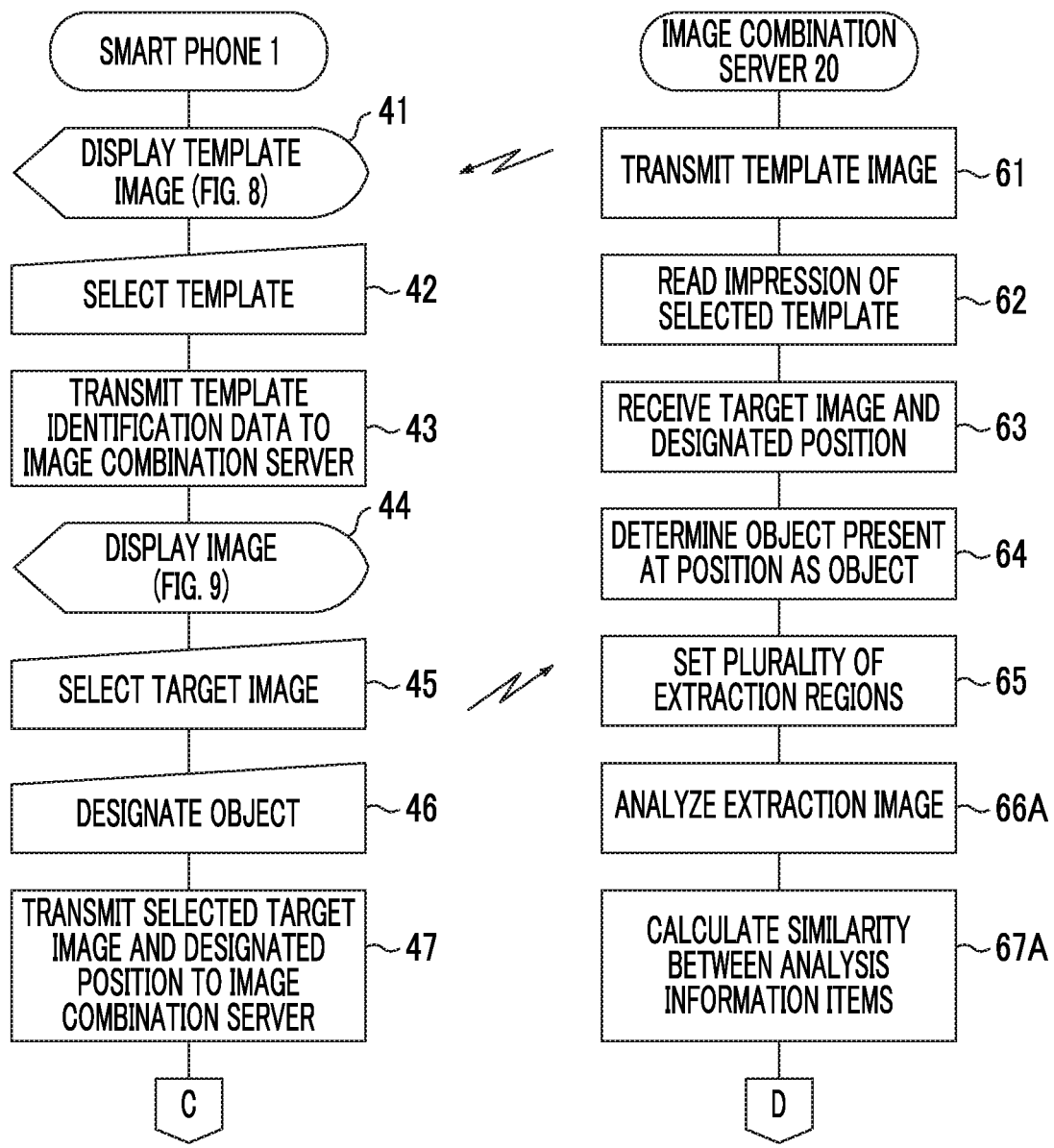
FIG. 25 is a flowchart illustrating a portion of the procedure of the image combination system.

FIG. 25 illustrates still yet another embodiment and is a flowchart illustrating a portion of the procedure of the image combination system. The process illustrated in FIG. 25 corresponds to the process illustrated in FIG. 6. The same processes as those illustrated in FIG. 6 are denoted by the same reference numerals and the description thereof will not be repeated.

In the above-described embodiment, an extraction image with an impression matching the impression of the template image selected by the user (well-balanced composite image) is determined using the similarity between the impressions. However, in this embodiment, in a case in which images are combined with each other without using an impression, an extraction image that is well balanced with the template image selected by the user is determined.

The target image P1 is selected as described above and the CPU 21 determines an object from the selected target image P1 as described above (object determination unit). A plurality of extraction regions 101, 102, and 103 (see FIG. 11) are defined from the target image P1. Then, the CPU 21 analyzes the extraction images 111, 112, and 113 (Step 66A) and obtains image analysis information as described above (see FIG. 15). The impressions of the extraction images 111, 112, and 113 may or may not be determined. The similarity (analysis information similarity) between image analysis information for each of the extraction images 111, 112, and 113 and image analysis information (see FIG. 5) for the template image T4 is calculated as described above (Step 67A).

Then, similarly to the above, the CPU 21 determines an extraction region of an extraction image of which the calculated analysis information similarity is equal to or greater than a threshold value among the extraction images 111, 112, and 113 (extraction region determination unit). The CPU 21 combines the extraction image in the determined extraction region with the combination region 34 of the template image T4 (image combination unit).

Similarly to the above, in a case in which there are a plurality of extraction regions having an analysis information similarity equal to or greater than the threshold value, as illustrated in FIG. 19 or FIG. 21, the CPU 21 and the communication device 26 may display the plurality of extraction regions on the display screen 80 of the smart phone (first display control unit) such that the user of the smart phone 1 designates at least one of the plurality of extraction regions (designation unit). The CPU 21 may combine the extraction image in the designated extraction region with the combination region 34 of the template image T4.

Similarly to the above, the CPU 21 and the communication device 26 may display a composite image on the display screen 80 of the smart phone 1 (second display control unit). When the user of the smart phone 1 inputs at least one adjustment command among a position adjustment command, an enlargement command, a reduction command, and a rotation command for the extraction image combined with the combination region 34 to perform adjustment, the communication device 26 (adjustment command input unit) may receive the adjustment command and the CPU 21 may calculate the similarity between analysis information of the adjusted extraction image and analysis information of the template image for the same type of analysis information. The calculated similarity may be transmitted from the image combination server 20 to the smart phone 1 by the CPU 21 and the communication device 26 (notification unit) such that the user of the smart phone 1 is notified of the similarity. In addition, as a notification method, similarly to the above, the CPU 21 may change at least one of the color of the frame of the combination region 34, the thickness of the frame border, or the type of frame border, depending on the similarity.

As in the above-described embodiment, the target image P1 selected by the user may be the first composite image candidate and another image other than the target image P1 may be the next composite image candidate. For example, the CPU 21 calculates the similarity between the analysis information of the extraction image in the determined extraction region and the analysis information of the template image for the same type of analysis information (second calculation unit). The CPU 21 (target image detection unit) may detect an image with image analysis information having a similarity higher than the similarity between the analysis information of the extraction image 112 obtained from a composite image candidate of the target image P1 selected by the user and the analysis information of the template image from other images as the next composite image candidates. In this case, the CPU 21 (image combination unit) combines an extraction image (an extraction image in an extraction region with a shape similar to the shape of the combination region 34 of the template image T4) of the image detected from other images as the next composite image candidates with the combination region 34 of the template image T4. Preferably, other images as the next composite image candidates may or may not include the same object as the target image P1 selected by the user.

In the above-described embodiment, the smart phone 1 and the image combination server 20 communicate with each other through the Internet to generate a composite image.

However, the smart phone 1 or the image combination server 20 may perform all of the above-mentioned processes.

Figure 26:
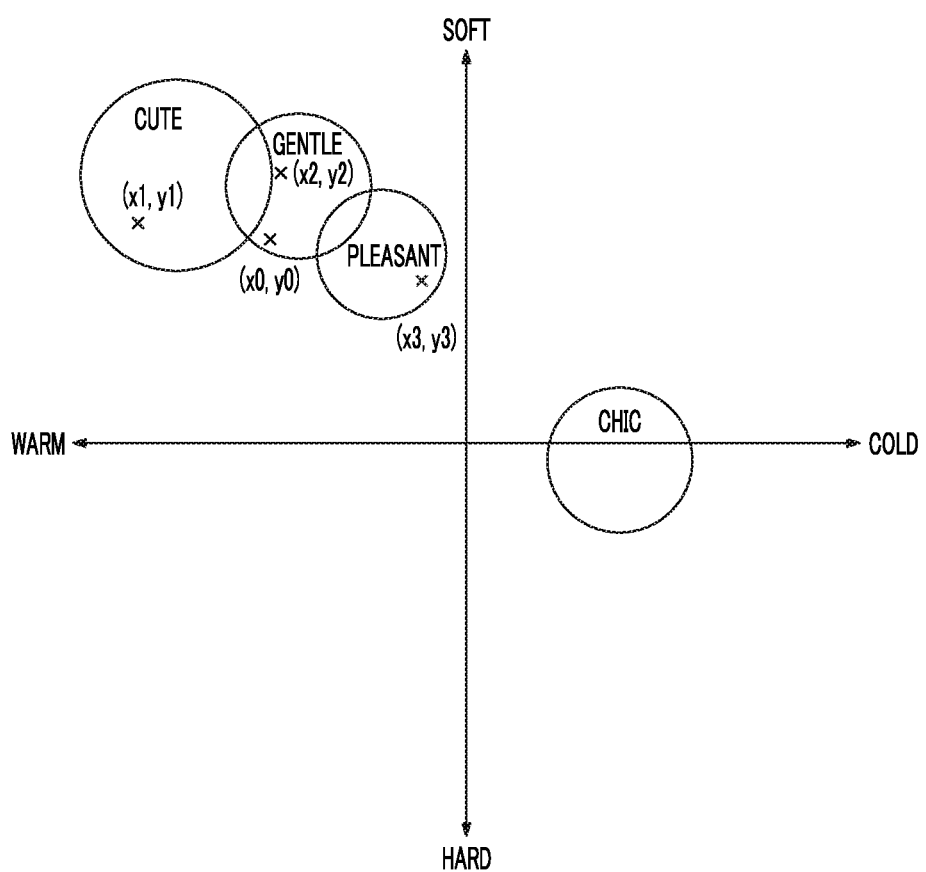
FIG. 26 illustrates an example of an impression space.

FIG. 26 illustrates an example of an impression space that is represented by two axes, that is, the horizontal axis indicating "warm" to "cold" impressions and the vertical axis indicating "soft" to "hard" impressions. In this embodiment, two axes are defined using the expressions, "warm", "cold", "soft", and "hard". However, the two axes may be defined by other expressions. For example, one of the two axes may be defined by expressions "bright" to "dull" and the other axis may be defined by expressions "casual" to "formal".

As described above, the range of an impression in the impression space is determined on the basis of image analysis information, such as brightness, contrast, chroma, a color, and a color balance. For example, the range of the "gentle" impression is from L6 to L9 in brightness, is from L5 to L8 in contrast, and is from L4 to L6 in chroma. The other image analysis information is determined on the basis of the items included in the range of the "gentle" impression. In addition to the range of the "gentle" impression, for other impressions, such as "cute", "pleasant", and "chic" impressions, image analysis information, such as brightness, contrast, chroma, a color, and a color balance included in the range of the each of the impressions, is determined. An impression is determined from the image analysis information.

Since impressions are represented by the impression space, it is possible to calculate the similarity between the impressions.

For example, in the above-described embodiment, it is assumed that the template image T1 selected by the user is represented by coordinates (x0, y0) in the impression space illustrated in FIG. 26. Similarly, it is assumed that the extraction image 111 is represented by coordinates (x1, y1), the extraction image 112 is represented by coordinates (x2, y2), and the extraction image 113 is represented by coordinates (x3, y3). The similarity between the template image T1 and the extraction image 111 is represented by the distance between the coordinates (x0, y0) of the template image and the coordinates (x1, y1) of the extraction image 111. Similarly, the similarity between the template image T1 and the extraction image 112 is represented by the distance between the coordinates (x0, y0) of the template image and the coordinates (x2, y2) of the extraction image 112 and the similarity between the template image T1 and the extraction image 113 is represented by the distance between the coordinates (x0, y0) of the template image and the coordinates (x3, y3) of the extraction image 113. An extraction image whose distance to the template image is equal to or less than a predetermined distance is the extraction image with an impression whose similarity to the impression of the template image is equal to or greater than the threshold value. In some cases, even when images have different impressions, the similarity between the images is higher than that between images with the same impression.

When the impression space is used, it is also possible to detect an extraction image with an impression close to the impression of the template image, as described above.

EXPLANATION OF REFERENCES

20: image combination server (image combination apparatus)

21: CPU (object determination unit, extraction region determination unit, image combination unit, first display control unit, second display control unit, first calculation unit, second calculation unit, target image detection unit)

23: compact disc (recording medium)

26: communication device (first display control unit, second display control unit, notification unit)

What is claimed is:

1. An image combination apparatus comprising a processor configured to:
   determine an object in a target image which is combined with a template image having a determined combination region;
   determine an extraction region of an extraction image having an impression whose similarity to an impression of the template image is equal to or greater than a threshold value among extraction images in a plurality of extraction regions which include the object determined by the processor and have a shape similar to the shape of the combination region of the template image in the target image; and
   combine the extraction image in the extraction region determined by the processor with the combination region of the template image,
   wherein the impression of the extraction image is determined from at least one extraction image analysis information item among the brightness, contrast, chroma, color, and color balance of the extraction image.

2. The image combination apparatus according to claim 1, wherein the similarity between the impression of the template image and the impression of the extraction image is obtained from a similarity table for calculating a predetermined similarity.

3. The image combination apparatus according to claim 1, wherein the impression of the template image is determined from at least one template image analysis information item among the brightness, contrast, chroma, color, and color balance of the template image, and
the similarity between the impression of the template image and the impression of the extraction image is obtained from a similarity between the template image analysis information and the extraction image analysis information which is the same type as the template image analysis information.

4. The image combination apparatus according to claim 1, wherein the processor is further configured to:
   control to display the extraction region determined by the processor on a display device so as to be superimposed on the target image,
   wherein the processor combines an extraction image in an extraction region which is designated for designating at least one of the extraction regions displayed by control of the processor with the combination region of the template image.

5. The image combination apparatus according to claim 1, wherein the processor is further configured to:
   control to display a composite image obtained by the processor on the display device;
   input at least one adjustment command among a position adjustment command, an enlargement command, a reduction command, and a rotation command for the extraction image which is combined with the composite image displayed by control of the processor;
   perform adjustment corresponding to the adjustment command input by the processor and calculating a similarity between the impression of the adjusted extraction image and the impression of the template image; and
   notify the similarity calculated by the processor.

6. The image combination apparatus according to claim 5, wherein the processor notifies the calculated similarity by changing at least one of a color of a frame, a thickness of a frame border, or the type of frame border of a combination region of the composite image displayed by the control of the processor, depending on the similarity calculated by the processor.

7. The image combination apparatus according to claim 1, wherein the processor is further comprising configured to:
   calculate the similarity between the impression of the extraction image in the extraction region determined by the processor and the impression of the template image; and
   detect another target image which has an impression with a similarity higher than the similarity calculated by the processor, is different from the target image, and includes same object as the object,
   wherein the processor combines a portion which includes the same object as the object in another target image detected by the processor with the combination region of the template image.

8. The image combination apparatus according to claim 7, wherein the processor detects another target image of which a portion includes the same object as the object, has a shape similar to the shape of the combination region of the template image, and has an impression with a similarity higher than the similarity calculated by the processor.

9. An image combination apparatus comprising a processor configured to:
   determine an object in a target image which is combined with a template image having a determined combination region;
   determine an extraction region of an extraction image having analysis information, which is the same type as at least one template image analysis information item among the brightness, contrast, chroma, color, and color balance of the template image and whose similarity to the template image analysis information is equal to or greater than a threshold value, among extraction images in a plurality of extraction regions which include the object determined by the processor and have a shape similar to the shape of the combination region of the template image in the target image; and
   combine the extraction image in the extraction region determined by the processor with the combination region of the template image.

10. The image combination apparatus according to claim 9, wherein the processor is further configured to:
    control to display the extraction region determined by the processor on a display device so as to be superimposed on the target image,
    wherein the processor combines an extraction image of an extraction region which is designated for designating at least one of the extraction regions displayed by control of the processor with the combination region of the template image.

11. The image combination apparatus according to claim 9, wherein the processor is further configured to:
    control to display a composite image obtained by the processor on the display device;
    input at least one adjustment command among a position adjustment command, an enlargement command, a reduction command, and a rotation command for the extraction image which is combined with the composite image displayed by control of the processor;
    perform adjustment corresponding to the adjustment command input by the processor and calculating a similarity between the analysis information of the adjusted extraction image and the analysis information of the template image for the same type of analysis information; and
    notify the similarity calculated by the processor.

12. The image combination apparatus according to claim 11,
    wherein the processor notifies the calculated similarity by changing at least one of a color of a frame, a thickness of a frame border, or the type of frame border of a combination region of the composite image displayed by the control of the processor, depending on the similarity calculated by the processor.

13. The image combination apparatus according to claim 9, wherein the processor is further configured to:
    calculate the similarity between the analysis information of the extraction image in the extraction region determined by the processor and the analysis information of the template image for the same type of analysis information; and
    detect another target image which has analysis information with a similarity higher than the similarity calculated by the processor, is different from the target image, and includes same object as the object,
    wherein the processor combines a portion which includes the same object as the object in another target image detected by the processor with the combination region of the template image.

14. The image combination apparatus according to claim 13,
    wherein the processor detects another target image of which a portion includes the same object as the object, has a shape similar to the shape of the combination region of the template image, and has analysis information with a similarity higher than the similarity calculated by the processor.

15. An image combination apparatus comprising a processor configured to:
    determine an object in a target image which is combined with a template image having a determined combination region;
    determine an extraction region of an extraction image having an impression which is determined from at least one image feature amount among the brightness, contrast, chroma, color, and color balance of the extraction image in the extraction region and is the same as an impression of the template image, among a plurality of extraction regions which include the object determined by the processor and have a shape similar to the shape of the combination region of the template image in the target image; and
    combine the extraction image in the extraction region determined by the processor with the combination region of the template image.

16. An image combination method using the image combination apparatus according to claim 1 comprising:
    causing the processor to determine the object in the target image which is combined with the template image having the determined combination region;
    causing the processor to determine the extraction region of the extraction image having the impression whose similarity to the impression of the template image is equal to or greater than the threshold value among extraction images in a plurality of extraction regions which include the object determined by the processor and have the shape similar to the shape of the combination region of the template image in the target image; and
    causing the processor to combine the extraction image in the extraction region determined by the processor with the combination region of the template image.

17. An image combination method using the image combination apparatus according to claim 9 comprising:
    causing the processor to determine the object in the target image which is combined with the template image having the determined combination region;
    causing the processor to determine the extraction region of the extraction image having analysis information, which is the same type as at least one template image analysis information item among the brightness, contrast, chroma, color, and color balance of the template image and whose similarity to the template image analysis information is equal to or greater than the threshold value, among extraction images in a plurality of extraction regions which include the object determined by the processor and have the shape similar to the shape of the combination region of the template image in the target image; and causing the processor to combine the extraction image in the extraction region determined by the processor with the combination region of the template image.

18. An image combination method using the image combination apparatus according to claim 15 comprising:
    causing the processor for determining the object in the target image which is combined with the template image having the determined combination region;
    causing the processor to determine the extraction region of the extraction image having the impression which is determined from at least one image feature amount among the brightness, contrast, chroma, color, and color balance of the extraction image in the extraction region and is the same as the impression of the template image, among a plurality of extraction regions which include the object determined by the processor and have the shape similar to the shape of the combination region of the template image in the target image; and
    causing the processor to combine the extraction image in the extraction region determined by the processor with the combination region of the template image.

19. A non-transitory computer readable recording medium storing a program that controls a computer of the image combination apparatus according to claim 1 such that the computer performs:
    determining the object in the target image which is combined with the template image having the determined combination region;
    determining the extraction region of the extraction image having the impression whose similarity to the impression of the template image is equal to or greater than the threshold value among extraction images in a plurality of extraction regions which include the determined object and have the shape similar to the shape of the combination region of the template image in the target image; and
    combining the extraction image in the determined extraction region with the combination region of the template image.

20. A non-transitory computer readable recording medium storing a program that controls a computer of the image combination apparatus according to claim 9 such that the computer performs:
    determining the object in the target image which is combined with the template image having the determined combination region;
    determining the extraction region of the extraction image having analysis information, which is the same type as at least one template image analysis information item among the brightness, contrast, chroma, color, and color balance of the template image and whose similarity to the template image analysis information is equal to or greater than the threshold value, among extraction images in a plurality of extraction regions which include the determined object and have the shape similar to the shape of the combination region of the template image in the target image; and
    combining the extraction image in the determined extraction region with the combination region of the template image.

21. A non-transitory computer readable recording medium storing a program that controls a computer of the image combination apparatus according to claim 15 such that the computer performs:
    determining the object in the target image which is combined with the template image having the determined combination region;
    determining the extraction region of the extraction image having the impression which is determined from at least one image feature amount among the brightness, contrast, chroma, color, and color balance of the extraction image in the extraction region and is the same as the impression of the template image, among a plurality of extraction regions which include the determined object and have the shape similar to the shape of the combination region of the template image in the target image; and
    combining the extraction image in the determined extraction region with the combination region of the template image.

* * * * *